US012700027B2

(12) United States Patent
Garbos

(10) Patent No.: US 12,700,027 B2
(45) Date of Patent: Aug. 4, 2026

(54) SYSTEM AND METHOD FOR CURATING MEMORIES

(71) Applicant: Hallmark Cards, Incorporated, Kansas City, MO (US)

(72) Inventor: Jennifer Richards Garbos, Kansas City, MO (US)

(73) Assignee: Hallmark Cards, Incorporated, Kansas City, MO (US)

(*) Notice: Subject to any disclaimer, the term of this patent is extended or adjusted under 35 U.S.C. 154(b) by 422 days.

(21) Appl. No.: 18/136,327

(22) Filed: Apr. 18, 2023

(65) Prior Publication Data

US 2023/0419386 A1 Dec. 28, 2023

Related U.S. Application Data

(60) Provisional application No. 63/460,248, filed on Apr. 18, 2023, provisional application No. 63/356,177, filed on Jun. 28, 2022.

(51) Int. Cl.
| *G06Q 30/00* | (2023.01) |
| *B42D 15/04* | (2006.01) |
| *G06Q 20/10* | (2012.01) |
| *G06Q 30/0601* | (2023.01) |
| *G06T 13/20* | (2011.01) |
| *G06T 17/00* | (2006.01) |
| *G06V 10/44* | (2022.01) |

(52) U.S. Cl.
CPC ....... *G06Q 30/0631* (2013.01); *B42D 15/045* (2013.01); *G06Q 20/10* (2013.01); *G06Q 30/0601* (2013.01); *G06Q 30/0643* (2013.01); *G06T 13/20* (2013.01); *G06T 17/00* (2013.01); *G06V 10/44* (2022.01)

(58) Field of Classification Search
CPC .............. G06Q 30/0631; G06Q 20/10; G06Q 30/0601; G06Q 30/0643; B42D 15/045; G06T 13/20; G06T 17/00
See application file for complete search history.

(56) References Cited

U.S. PATENT DOCUMENTS

2019/0001732 A1* 1/2019 Ongsitco .............. B42D 15/022

OTHER PUBLICATIONS

Corrigan-Kavanagh E, Frohlich DM, Scarles C. "Re-invigorating the photo album: augmenting printed photobooks with digital media." Pers Ubiquitous Comput. 2023;27(2):467-480. doi: 10.1007/s00779-022-01699-5. Epub Nov. 24, 2022. (Year: 2022).*

* cited by examiner

*Primary Examiner* — Anand Loharikar
(74) *Attorney, Agent, or Firm* — Practus, LLP; Jesse J. Camacho

(57) ABSTRACT

Systems and methods are provided that include receiving a first image of a first portion of a greeting card wherein the first image includes identifying data useable to identify the first image, storing the identifying data in a datastore, associating the identifying data with a first user, determining characterization information from the first image that characterizes aspects of the first image, receiving from a computing device a second image of a second portion of the greeting card wherein the second image includes at least part of the first portion of the greeting card, utilizing the second image to identify the first user, correlating the characterization information of the first image to attributes of one or more product offerings, and communicating an indication of at least one of the product offerings to the computing device.

7 Claims, 23 Drawing Sheets

206

204

202

514B

810   RECEIVE MEMORIES INFORMATION RELATED TO A FIRST SET OF IMAGES

812   RECEIVE MEMORIES-ACCESSIBILITY INFORMATION

814   RECEIVE A REQUEST FOR PROPOSED GIFT IDEAS

816   REFERENCE HISTORICAL INFORMATION ABOUT GIFT IDEAS

818   DETERMINE A SET OF PROPOSED GIFTS

820   SEND GIFT INFORMATION BASED ON THE RELEVANT ATTRIBUTES

924

922

920

926

~ 1010 ~

1410 PRESENT SCAN CONTROL ON A USER DEVICE

1412 RECEIVE INDICATION THAT SCAN CONTROL WAS ENGAGED

1414 PRESENT CAPTURE WINDOW ON USER DEVICE

1416 CAPTURE IMAGE OF PHYSICAL DEVICE

1418 IDENTIFY A DIGITAL ASSET BASED THE CAPTURED IMAGE

1420 PRESENT THE DIGITAL ASSET ON THE USER DEVICE

SYSTEM AND METHOD FOR CURATING MEMORIES

CROSS-REFERENCE TO RELATED APPLICATIONS

This claims the benefit of the following two provisional applications: (1) U.S. Provisional Patent Application No. 63/356,177 filed on Jun. 28, 2022 entitled "SYSTEM AND METHOD FOR VIRTUALIZED OFFERINGS" and (2) U.S. Provisional Patent Application No. 63/460,248 filed on Apr. 18, 2023 entitled "CURATING, ASSOCIATING, AND CONVEYING MEMORY REPRESENTATIONS." This Application incorporates by reference for all purposes all of the aforementioned applications as well as U.S. Pat. No. 11,263,503 granted on Mar. 1, 2022 and entitled "SIGNATURE-BASED UNIQUE IDENTIFIER" and U.S. patent application Ser. No. 16/874,414 filed on May 14, 2020 entitled "SIGNATURE-BASED UNIQUE IDENTIFIER."

BACKGROUND

Individual and shared experiences favorably contribute to people's mental health, sense of belonging, and life enjoyment. But curating and memorializing representations of memories is difficult. For example, if someone was planning on attending a wedding, became ill at the last minute, and was unable to attend the event, they may still want to experience aspects of the wedding. But finding photographs, videos, sound clippings, etc. of the wedding is currently difficult. The state of the art could be improved by, among other things, providing a way to store individual memories, selectively expose them to others, locate others' memories, and contribute to them.

BRIEF DESCRIPTION OF THE DRAWINGS

The present disclosure is described in detail below with reference to the accompanied drawing figures, wherein.

DETAILED DESCRIPTION

Figure 1A:
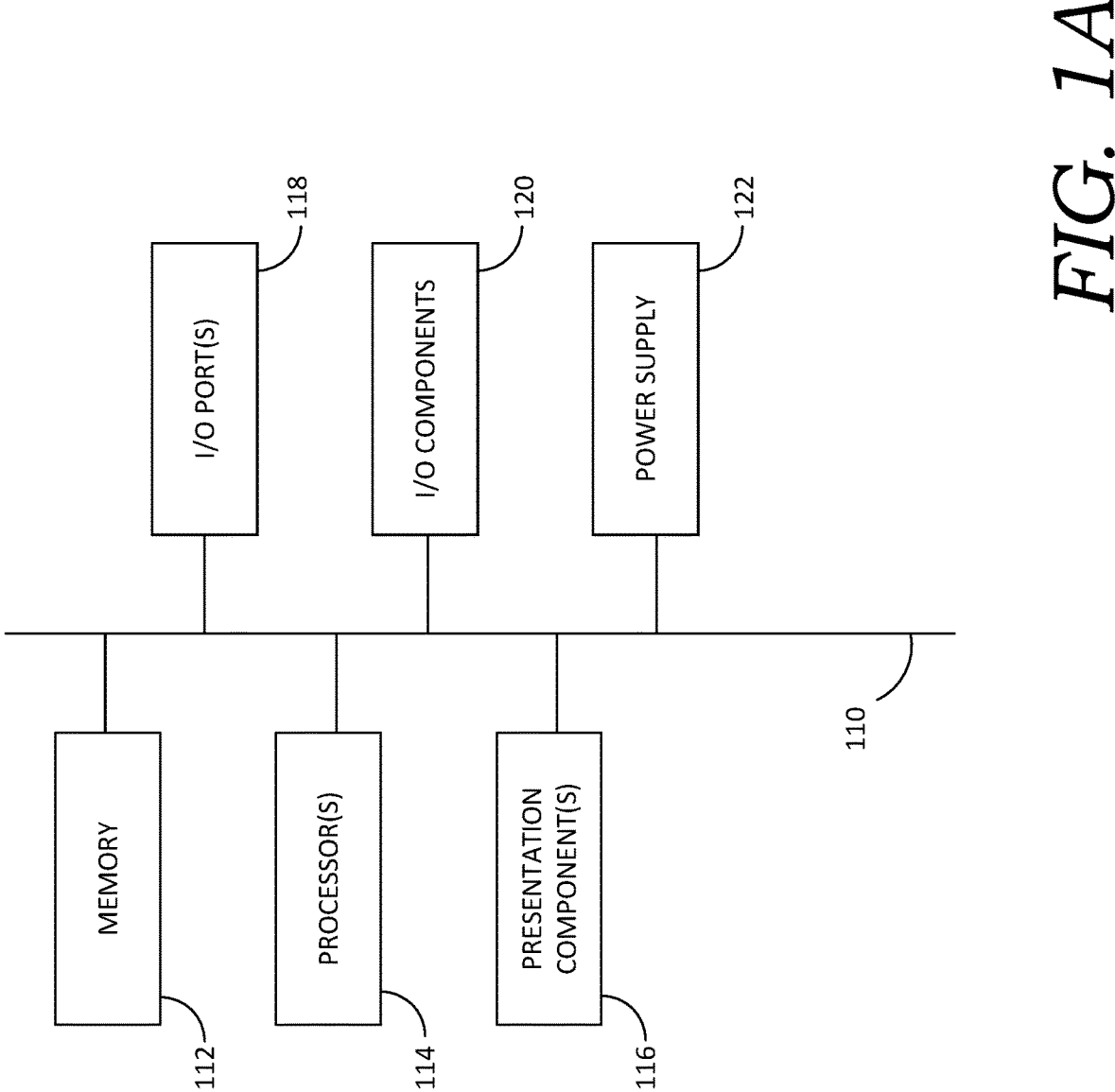
FIG. 1A is an illustrative computing device suitable for use in aspects of embodiments of the disclosed technology.

The subject matter herein is described with specificity to meet statutory requirements. But the description itself is not intended to limit the scope of this patent inconsistent with the claims. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as requiring a particular order among or between various steps herein disclosed unless and except when the order of individual steps is explicitly described.

As one skilled in the art will appreciate, embodiments of the disclosed technology may be embodied as, among other things: a method, system, or set of instructions embodied on one or more computer-readable media. Accordingly, the embodiments may take the form of a hardware embodiment, a software embodiment, or an embodiment combining software and hardware, including in a virtualized environment such as the metaverse. In one embodiment, the disclosed technology takes the form of a computer-program product that includes computer-usable instructions embodied on one or more computer-readable media.

Memory Curation.

One aspect of the disclosed technology takes the form of a memory-curation app (such as a set of computer-executable instructions) embodied on one or more computer-readable media that are executable by at least one processor. When executed, the set of instructions facilitate multiple processes or sets of steps and expose a set of functionalities to a user. The app enables representations of memories (sometimes referred to herein as just "memories") to be curated in the aggregate from multiple users, captured by a single user, memorialized in connection with physical objects (such as heirlooms, relics, graduation invitations, wedding announcements, or any object that is important to a user), or combinations of the same. In one embodiment, the app provides multiple modes of operation to facilitate memory-curation capabilities. But in another embodiment, the functional aspects are presented or selectable via a user interface of an app generally.

In one embodiment, the application operates in multiple modes. For example, three illustrative modes are scrapbook mode, diary mode, and treasures mode. These modes can be entered into by way of receiving user input via one or more controls, such as controls 314, 316, and 318 depicted in FIG.

3. The controls are presented on a user interface 312 of a computing device 310 in one embodiment. Acting on control 314 will enter into a first mode 314A, such as scrapbook mode in one embodiment. Similarly, control 316 is usable to engage a second mode 316A, such as diary mode. And control 318 is useable to enter treasures mode 318B, which stores pictures of physical objects that a user cares about. For example, a user might have been given a watch as an heirloom. The user can take a picture 332 of the watch 334 to ensure that a picture of the watch is preserved, for example, as well as associated memories about the watch, such as the giver, why it is special, the occasion, etc.

In one embodiment, the app provides a way for users to interact with digitized memories. Interactions include storing or adding new memories, manipulating the memories (e.g., annotating, modifying, etc.), finding stored memories, and sharing memories with others as well as outputting them to different media.

Figure 3:
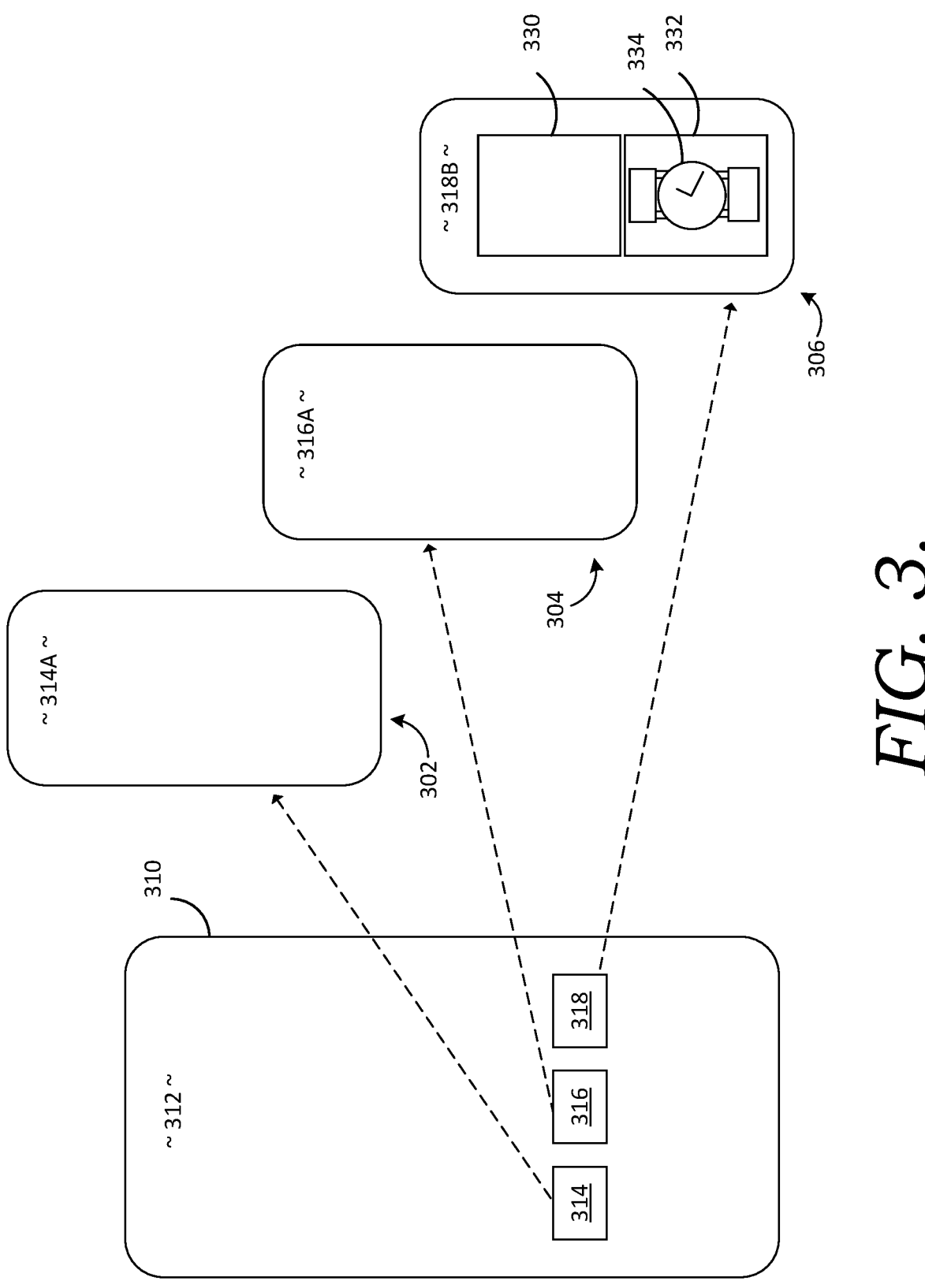
FIG. 3 provides illustrative user interfaces for optional operational modes such as scrapbook mode, diary mode, and treasures mode consistent with one or more embodiments of the disclosed technology.

In scrapbook mode, memories are stored from multiple users. For example, memories can be accessed that are from other users besides a user associated with a set of login credentials for the app. Numeral 302 of FIG. 3 depicts an embodiment of the disclosed technology in scrapbook mode.

An aspect scrapbook mode, the app allows users to add photos, videos, voice recordings, text, or any other digital content to a shared album by submitting those memories memorizations to a specific album name associated with the user who created the album, e.g., the album "creator". Alternatively, the creator of the album can invite contributors via a unique web link, code, QR code, string of digits, login credentials, or other invitation method. The other contributors may add, modify and interact with content in the album. The creator can set permissions for each contributor to the album or each can function as a creator. Alternatively, the creator can maintain control of the scrapbook completely and contributors can then add the content into datastore (such as virtual shoebox) from which the creator can pull the digital content to curate the scrapbook. Scrapbooks can be "finalized" such that additional content adds or modifications cannot take place as they were previously allowed. However, the scrapbook does not need to be finalized to be experienced by the contributors or other viewers. It can remain a consistently dynamic document and any links to it can always lead to the most recent state.

One example of the disclosed technology includes a creator setting up a shell for the scrapbook. The system can receive search criteria from a user. For example, the creator could add the tag (or a user can search for) #OrlandoSummerVacation2022 album, thereby enabling relevant albums to be presented. The system allows users to scrolls albums to find the associated with the name or attributes of a person they recognize. Users can submit content for that album. Alternatively, users can submit a request for access, which that be routed for permission, such as to the creator. If the user does not find an album with that name, they may create one.

An aspect of the disclosed technology includes providing collections of digital assets around a common occasion, event, date, group of people, etc., including from multiple people or sources.

An embodiment can facilitate personal digital-asset association (how assets are themed for addition to the scrapbook), which can include collaborative connections (allowing individual identification of related memories and contribution to a single project); temporal connections (related memories identified based on time stamp of photos/assets); location-based connections (geolocation, related memories identified based on location stamp of photos/assets such as "Paris or "our first home"); occasion-based connections (related memories identified based on visually identifiable icons, colors, etc., such as red/green, holiday ornaments, Christmas trees, tinsel, etc.); people-based connections (based on people's physically identifiable attributes, e.g., fac The disclosed technology can also enhance content. For example, digital files can be provided/included to complement a scrapbook based on asset information (noted above), e.g., digital stickers, graphical elements, font choices, words, etc. Templates can be provided for slideshows to be automatically recommended based on the format, number, and type of digital memories. Background sound can be provided to match the tone of the content (e.g. color, location, occasion appropriate).

The disclosed technology can facilitate automatic attributions. For example, files can be added that are automatically attributed to a contributor (with an option to manually change the information). Attribution can be based on a contributor. Additional automatic attribution may also be included such as style influences of a contributor (e.g., contributors who have a history of adding cute animal stickers or GIFs to their content could have that style cataloged in association with a digital memory). Contributors can be invited through the app contacts or via a link sent through text, message, email, and the like. Permissions can be set differently for different contributors (e.g., add content, edit format/order, view only, add additional contributors, share, etc.). If both an initiator and a contributor are participants in the app, specific details for the contributor can automatically influence the automatic generation of a co-created scrapbook.

An aspect of the disclosed technology can include a journal-type feature, where collections of digital assets with related to a period of time and curated by a single person in one embodiment (or jointly). Promptings can be provided. For example, updates/contributions based on past engagements, profile information, life stage, occasions, seasonality, interactions with friends/contributors, scrapbook, journal entry automated analysis, etc. can be provided. Thought starters can be presented in the future or saved for another day. Questionnaires that direct future prompts to the type of memories that the user wants to capture can be provided. And aspects of the technology described in U.S. Pat. No. 9,449,350 can be utilized.

Other content enhancements can also be provided. For example, Captions can be automatically suggested based on uploaded personal content metadata (e.g., photo taken after 6 P.M. adds a "night" specific caption) or image recognition (e.g., two detected faces automatically includes "we" captions). Digital imagery can be automatically included to complement the scrapbook based on asset information, e.g., digital floral "stickers," graphical elements such as borders, font choices, background colors, etc. Relationships can be identified through facial and emotional recognition and tagged with captions that include relationship indicators such as sister, BFF, mother, grandmother, work friend, etc. And the disclosed technology can facilitate transformation from one type of content to another (e.g., a still image extracted from a video file, text-to-voice, audio as soundtrack to still slide show, automatic animation of still images, etc.).

In diary mode, the app captures personal details about memories. The personal details can take the form of specific photographs, video clips, and other digitized forms of memory representations. Numeral 304 of FIG. 3 depicts an embodiment of the disclosed technology in scrapbook mode.

Diary mode can allow for entries by creators or include pre-populated entries that can be edited. Following the response to prompts, content can automatically be enhanced with complementary design icons and editorial captions. Moreover, aspects of the technology described in U.S. Pat. No. 9,449,350 (which is hereby incorporated by reference) can also be leveraged.

In treasures mode, the app stores representations of physical objects. Each representation is indicated as being a representation of a physical object and is associated with the owner of the app via a set of user credentials. Numeral 306 of FIG. 3 depicts an embodiment of the disclosed technology in treasures mode.

One aspect of the disclosed technology provides a connection between images (or other representations) of meaningful physical artifacts and digital assets from those memories. The digital assets can be images, videos, audio or digital files associated with the same occurrence or event in one embodiment. Or they can be compilations from related events, relationships, experiences or places. For example, a physical artifact serving as a souvenir may connect to photos from that same trip or also include any photos taken during any trip to that location. Alternatively, an artifact of a BFF necklace may connect to images of the user wearing that necklace but may also connect to images of the user and the other holder of the other half of the necklace regardless of whether they are both wearing them.

Treasures can include collections of digital assets representative of physical objects owned or experienced by a user. User digital-asset association (how user assets are associated with the image of the physical keepsake object) can be provided. Image recognition can be used with images/videos with other views/perspectives of the representative object to automatically connect to memories and add to a video slideshow. Or user input can be received that determine content to be added to a slideshow (or remove what was automatically added).

The disclosed technology can facilitate purchase recommendations. A "SHOP+SHARE" feature can be tailored to the user's preferences as indicated by the images stored in "Treasures" (e.g., images of wearable items may cause other wearable product formats to show higher in the "SHOP" category vs. displayable type items like framed sentiments or figurines). An embodiment provides friends and collaborator users assistance in purchasing gifts for a person based on the past item image storage history and identifiers associated with those items (e.g., item type—like wearable, displayable, etc., style—like traditional, modern, casual, etc., color—shades, specific colors, etc.). A gift-recommender functional aspect can help find a gift that other users who have documented images have also preferred and may prevent purchases that are too similar (e.g., the tool may recommend an Arizona State T-shirt with a tradition logo on the pocket area instead of another sweatshirt).

One embodiment provides content related to objects in images. For example, an upload of a greeting card can leading to providing related content for use/customization of a user's app-based story/journal entries. For example, a user might upload a Rolex watch that unlocks content provided by Rolex. Content can include digital stickers, recommendation words/copy/sentiment, transition slides/images (to facilitate movement between images/content), sounds/music, animated GIFs, videos or shorts, and the like.

The disclosed technology can facilitate data enhancements. For example, it can make asset recommendations, digital files available to complement memories based on uploaded asset information. It can also propose non-obvious complementary assets, such as digital images, videos, sounds, etc. that hold symbolic meaning or significance with the seemingly unrelated occasion, holiday or event (e.g., dandelion flower when expressing sympathy or grief)

One aspect of the disclosed technology includes exposing the memories in the app to others to enable them to select objects to present to the app owner based on the owner's memories. The app owner can control the amount of information shared. In one embodiment, information the owner's memories information is shared on a blockchain in such a way that access can be granted while preserving anonymity of all or all other information of the owner in a zero-trust environment.

Another aspect of the disclosed technology is to enrich the app owner's memories information with historic contextual data to better provide gift or interaction suggestions. For example, a datastore is provided that stores historical information related to interacting with others, including, for example, information for performing analytics or associated metrics such as recipient demographics, occasions, holiday information, personalization options, collections, tone, features, and customer ratings. This information can be cross-referenced with the app owner's stored memory information to suggest gifts, responses, and other interactions (both to the owner and others).

For example, say an app owner took pictures of flowers or otherwise added pictures of flowers to the app (such as in diary mode). Further, say that a third party wanted to give a gift to the app owner. The app would know that the owner has included pictures of flowers, would identify other users who have pictures of flowers in their memories, would identify the types of items those users gave to others (or marked as highly rated), and—in addition to or alone—present on a user interface gift ideas for the owner.

The logic behind the gift proposals is more elaborate in some embodiments. For example, instead of or beyond considering only other gifts purchased or highly rated, the app would understand that flowers are associated with a certain tone, such as "loving," and then suggest gifts that have been associated with that tone.

Illustrative recipient demographics include any boy, any girl, any man, any woman, any loved one, aunt, aunt & uncle, best man, big brother, big sister, bonus brother, bonus dad, bonus daughter, bonus family, bonus mom, bonus son, bride, bride & bride, bride & groom, bride-to-be, brother, brother & family, brother & spouse, brother-in-law, bus driver, caregiver, clergy, clergy & spouse, coach, couple, cousin, co-worker, dad-to-be, daughter, daughter & family, daughter & spouse, daughter-in-law, dentist, doctor, everyone, family, father, father & spouse, father-in-law, fiancée, friend, goddaughter, godfather, godmother, godparents, godson, granddaughter, granddaughter & family, granddaughter & spouse, grandfather, grandmother, grandparents, grandson, grandson & family, grandson & spouse, great-granddaughter, great-grandfather, great-grandmother, great-grandparents, great-grandson, groom, groom & groom, healthcare professional, host, husband, kid, maid of honor, mail & package carrier, manager, mom-to-be, mother, mother & spouse, mother-in-law, neighbors, nephew, nephew & family, nephew & spouse, new mom, new parents, niece, niece & family, niece & spouse, nurse, parents, parents-to-be, salon professional, scout leader, secret pal, service provider, significant other, sister, sister & family, sister & spouse, sister-in-law, son, son & family, son & spouse, son-in-law, spouse, stepdaughter, stepmother, stepson, teacher, teen, twins, uncle, veterinarian, wife.

Illustrative occasions include adoption, anniversary, baby shower, bachelorette party, baptism & christening, bar mitzvah, bat mitzvah, birthday, bridal shower, clergy appreciation, confirmation, congratulations, encouragement, engagement, first communion, friendship, get well, goodbye, good luck, graduation, hello, housewarming, love, military appreciation, miss you, new baby, nurses day, pregnancy, quinceañera, retirement, sorry, sympathy, teacher appreciation, thank you, thinking of you, weddings, and the like.

Illustrative personalizations include a custom internal message, a custom photo, and a custom video.

Illustrative collections can include groupings based on movies, characters, theme parks, famous people, pets, television shows, video games, and the like.

Illustrative tone information or categorizations includes cute, edgy, funny, heartfelt, inspirational, religious, romantic, short & simple, thought & nice, thoughtful & nice, and the like.

Illustrative features include add-photos capable, blank, detachable gift, lights, money/gift card holder, motion, plays song/sound, pop-up, unique format, year dated, and the like.

Illustrative customer ratings include customer feedback (e.g., 1-5 stars), how well the recipient liked the gift, numbers sold, etc.

For example, one method of practicing the disclosed technology includes obtaining from a first user device a first representation (such as a picture) of a portion of a greeting card. The first image includes a custom image such as a handwritten marking made by a user and a set of fiducial marks, a photograph, or other custom image. This custom image is stored in the system on creation by a sender and thus later identifiable by the system upon request by a recipient. Thus, an embodiment of the method further includes utilizing the first image to identify stored memories associated with a second user, identifying a first set of one or more attributes associated with the stored memories, and presenting via a computing device one or more gift suggestions based on the first set of attributes.

In one embodiment, the above method is facilitated by at least a partially closed environment. For example, the ability to us the first image portion as a lookup key is facilitated by having previously stored the image portion such that it is recognizable at a later time. In other words, a first user, such as a person wanting to congratulate a graduate, adds a photograph to or writes a message in his or her handwriting and among a set of fiducial marks and uploads the images to a datastore using a computing device such as a smartphone or PC. The app described herein can access the datastore. Later the recipient (the graduate) receives the card.

At this point, facilitating reciprocity (e.g., generally, responding to a gift giver) is difficult absent the disclosed technology. But in one embodiment of the disclosed technology, the graduate uses the app described herein. Thus, the recipient can utilize the app (running on a computing device) to take a picture of the handwritten note and upload it as a memory. Because the app has access to the datastore, the app can recognize the handwriting of the note, identify the sender, and thereby access the sender's memories, other gifts give, gifts received, and other attributes of the send.

The app can then use those attributes of the sender to propose gifts and facilitate reciprocity, improving the process of the graduate expressing his or her gratitude for the graduation note. For example, if the graduate would like to send a thank-you note, instead of sending a bland note, the app would suggest a thank-you note whose front image reflects an image based on the attributes of the sender's memories and other attributes. The app knows the address of the sender because that information was also gathered and stored in the datastore when the sender sent the initial gift. Thus, in one embodiment, the app presents the recipient an option to automatically mail a thank-you gift without the recipient ever needing to provide (or even know) the sender's address, e.g., if the sender desires to keep his or her electronic or physical address private.

In another embodiment, the app uses a uniquely identifiable image instead of a user's handwriting. One example includes a QR code.

As mentioned, aspects of the technology described herein can generate a unique identifier for a visual media that includes pre-printed visual indications on the visual media and a user's handwritten marking, such as a signature, doodle, note, or drawing. The visual media includes printed media, such as a greeting card, gift card, post card, picture frame, Christmas ornament, or the like. The visual media can also include electronic media, such as an e-card, email, social media post, and the like.

The unique identifier is unique because of visual characteristics created by a user's handwritten marking in combination with the location of the marking on the visual media. In one aspect, the marking is a handwritten signature. In general, people have unique signatures when they are handwritten. For example, it would be rare for two people with the same name to have visually identical signatures. That is especially true because the signature is being analyzed by a computer imaging system, which can detect fine distinctions. As used herein, a signature is a visible production of all or part of a user's name by hand using a pen, pencil, stylus, finger, or other writing implement. The signature could be in cursive or printed letters. The signature can also comprise entirely a mark or marks the user commonly uses to identify himself or herself.

The location of the marking, such as a signature, on the visual media can be determined by including preprinted fiducial marks on the visual media. In general, it is beneficial for a fiducial marker to be a unique pattern that is easy for the computer software to recognize as a fiducial marker. It is also beneficial for the marker to be asymmetrical. It is easier to determine the relative positioning of the camera and the marker if some aspect of the marker is asymmetrical. An asymmetrical marker makes it possible for the vision software to determine which way the marker is oriented.

The fiducial markers act as landmarks that allow the size and location of the marking to be determined in absolute terms. The absolute size and location of the marking in combination with the handwritten marking itself can be used to create a unique identifier that in turn identifies the visual media to which the signature is affixed. In one aspect, a QR code or other machine-readable indicia may be provided on the visual media to identify a SKU for the visual media, such as the greeting card. This machine-readable indicia may be used in combination with the handwritten marking to create the unique identifier.

As used herein, the fiducial marks can be stand-alone marks, integrated marks, or derived from the actual design on the visual media (i.e., natural feature tracking). The stand-alone marks are visible apart from a design on the visual media. The examples herein are described in terms of stand-alone fiducial marks, but these examples are not intended to be limiting beyond the claims. Any type of fiducial mark or mark serving the purposes of the fiducial mark described herein, regardless of designation, may be used.

The fiducial marks can also be integrated. Integrated fiducial marks may also be described as aesthetic marks. Integrated fiducial marks are integrated into a design or possibly designed around. The typical user would not recognize the integrated fiducial marks as anything other than the design because they are often just shapes commonly seen in different designs. For example, the integrated fiducial marks can be a pair of circles, ovals, or other shapes. The design development may be performed with any color, texture, shape or other features as long as the circle (or other shape) pairs are integrated. The ratio of the radius of two circles in a pair can uniquely identify an integrated mark from a look up table. Other characteristics of the mark and associated visual media, if applicable, could be extracted from the look up table and used to perform operations described herein. For example, spatial information could be retrieved from the look up table and used to identify characteristics of a signature or other user mark on a visual media.

In one aspect, the fiducial marks use natural feature tracking. Natural feature tracking evaluates a design with machine vision technology and identifies key points within a design that can serve as fiducial marks. For example, the features could include corners, edges, blobs, without using specifically designed ID markers. These features allow the system to identify the specific design, along with the spatial features of the visual media on which the design is found. Understanding the spatial features of the design allow for the spatial features of a signature or other mark to be identified, as described subsequently.

The unique identifier is then stored in computer memory on a user-experience server. The user-experience server can associate the unique identifier with a digital asset designated by the user. When the unique identifier is provided to the user-experience server a second time, the digital asset can be output to the computing device that provided the unique identifier the second time. For example, a recipient of a greeting card could scan the card to extract the unique identifier and then retrieve an associated digital asset, such as a personalized greeting video. Each time the unique identifier is provided, the digital asset can be output. In one aspect, storing the unique identifier includes storing an image of the handwritten marking along with other size and location characteristics ascertained from an analysis of the handwritten marking in relation to the fiducial markers. Supplemental information may be stored with the unique identifier, such as a SKU for the visual media, sender information (e.g., a name or user ID), a time the unique identifier was created, and the like.

The technology allows a sender of the visual media to associate the unique identifier with a digital asset, such a picture, audio file, or video file. The sender can then communicate the visual media to a recipient. The recipient uses an application to retrieve the digital asset associated with the unique identifier. The digital asset can then be output for the recipient's enjoyment.

In the case of the printed media, a camera on a computing device, such as smart phone, can be used by the sender to capture and store the unique identifier. Similarly, the recipient can use a smart phone to capture an image of the unique identifier. The image may then be processed by an application on the smart phone and used to retrieve the digital asset associated with the unique identifier. Alternatively, the phone can send the image to a cloud-based service that analyzes the image and retrieves the digital asset, which is the communicated to the smart phone.

Figure 4:
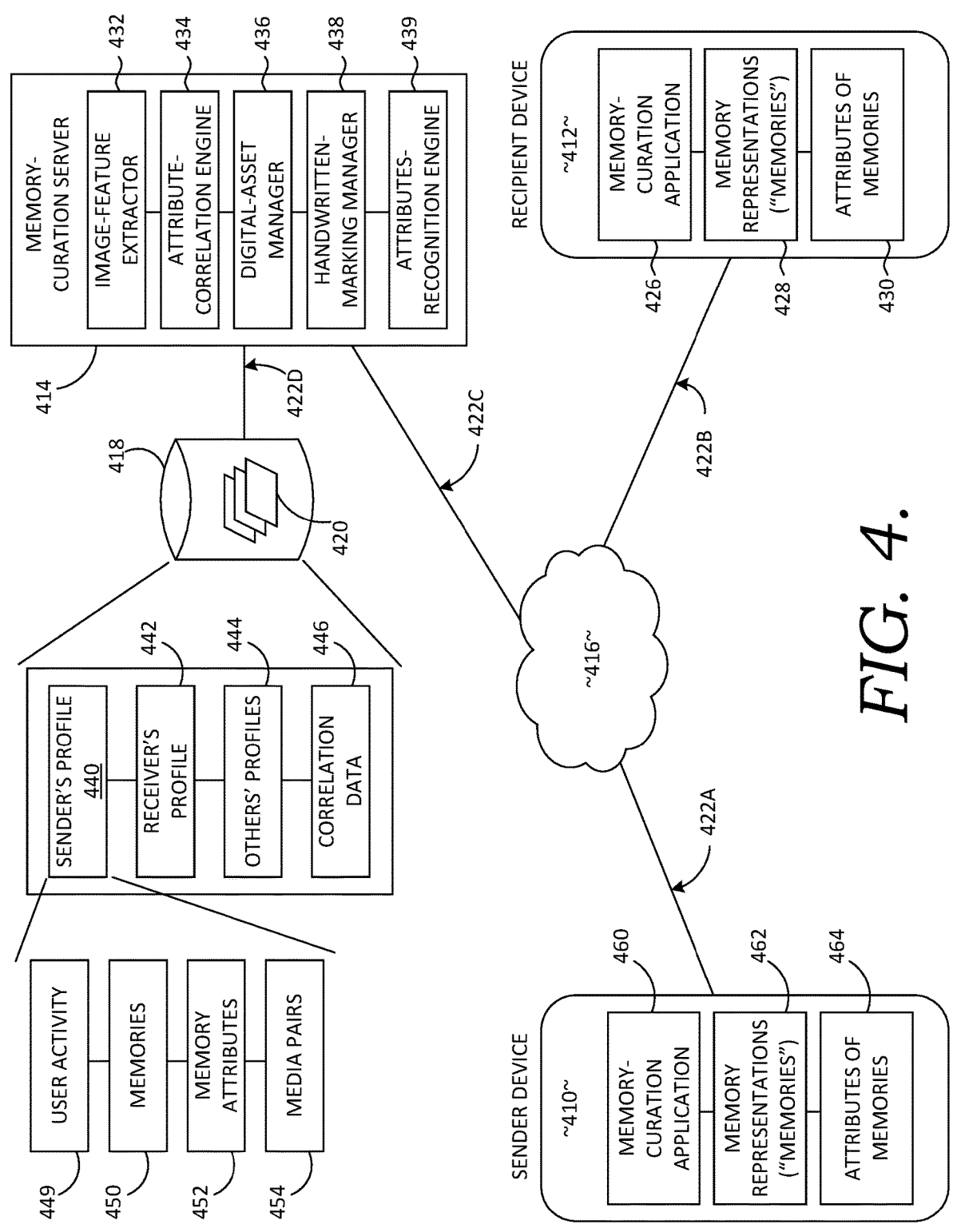
FIG. 4. depicts an illustrative operating environment suitable for practicing an embodiment of the disclosed technology.

FIG. 4 depicts an illustrative operating environment suitable for practicing an embodiment of the disclosed technology. The various hardware components have components such as those depicted in FIG. 1A. Although some components might be referenced in the singular for readability, they could be plural. For example, the item referenced as server 414 might actually be multiple servers or computing devices. And network 416 represents multiple networks that facilitate the communication of data.

At a high level, sender devices 410 and 412 communicate with memory-curation server 414 through communications network 416 over wireless or wired links 422A. Sender device 410 and 412 are illustrative computing devices, which may be a smartphone, PC, or other computing device. Communications network 416 may be one or more communications or computing networks. Memory-curation server 414 is also an illustrative computing device suitable for performing methods claimed herein.

Sender device 410 includes a first instance of a memory-curation application 460, memory representations 462, and attributes of memory representations 416 (also referred to simply as "memories" herein for short). Memory-curation application 460 is a set of computer-executable instructions embodied on more or computer-storage media. It can interact with the other components on sender device 410 as well as with memory-curation server 414 and its components.

Memory-curation application 460 stores memories 462. Memories 462 can be photographs, cherished voicemails or sound recordings, text messages, etc. They can be stored locally on sender device 410 or uploaded to a remote datastore such as datastore 418 (or both). Alternatively or additionally, attributes 464 of memories 462 could be stored. For example, say a memory 462 is a picture of flowers. Memory-curation application 460 could recognize the image as being of flowers, extract attribute information associated with the flowers, and store the picture, attributes, or both. The attributes can likewise be stored locally on device 410 or remotely in datastore 418.

In one embodiment, information about memories 462 is made available for other to access. A user can decide how much information to share and with whom it is shared. For example, a user could decide that pictures of individuals are to be kept confidential whereas pictures of inanimate objects would be accessible by other people. In another embodiment, a user might decide to make all pictures accessible. In still another embodiment, only attribute information 464 (or a portion thereon) is made available to others.

In an illustrative operation, the user of device 410 sends a memory 462 to recipient device 412, which is similarly configured to sender device 410. For example, recipient device 412 runs a second instance of memory-curation application 426, can store its own memoires 428 and/or attributes 430 of them.

Recipient device receives the memory item sent from sender device 410. As mentioned, the memory item can also be sored in datastore 420 by way of memory-curation server 414 in one embodiment. The user of recipient device 412 can use aspects of the disclosed technology to reciprocally send something to sender device.

In one embodiment, recipient device 412 sends the received image (or attributes of it) to memory-curation server 414. Memory-curation server 414 incudes an image-feature extractor 432, an attribute-correlation engine 434, a digital-asset manager 436, and a handwritten-marking manager 438 (all of which can include hardware and software aspects as reflected in FIG. 1A and its description). Not all of these must be included. Employing one or more of these components, server 414 identifies the image received from recipient device 412 as the image sent from sender device 410. In one embodiment, such identification is facilitated by way of memory-curation server 414 having access to both images and/or attributes.

Memory-curation server 414 can then access data 420 to propose items to the recipient application 426 that would be a good response to receiving the memory from sender 410. This can be carried out in a number of ways.

For example, in one embodiment, data 420 in datastore 418 is correlated with other data to identify the items to propose. Illustrative data used in the correlation includes past purchasing information about other users who have attributes in common with the first user, products rated highly by other users who have attributes in common with the first user, past purchasing information about purchases of the second user, attributes of the second user, attributes of the first user, attributes of other users who have attributes in common with the first user, attributes of other users who have attributes in common with the second user, or attributes of the first image.

By way of example, memory-curation server 414 could use the image data received from recipient device 412 to identify the sender from the sender's profile 440, which would make available information such as the senders activity 448, the sender's memories 450 (which would be the same as 462 if synced), attributes 452 of those memoires (which would be the same as 414 if synced), or media pairs 454, which can include a digital asset (such as a picture, audio file, or video file) and a unique identifier associated with it.

Memory-curation server 414 could then refence the sender's data 450 and/or attributes 452, 448, 442 etc., to determine a set of proposed reciprocity items to recipient 412. Alternatively or additionally, memory-curation server 414 could correlate such sender's data with data 420 other users to determine the proposed items, using for example, correlation engine 434. For example, if sender 410 sent a picture of flowers to recipient 412, then memory-curation server 414 could cross-reference other pictures of flowers in datastore 418, determine users respectively associated with the other pictures of flowers, determine what those other users purchased or ranked, and factor use that information to prepare the proposed-items list.

Memory-curation server 414 could also consider attributes of the receiver to prepare the proposed-items list. Say, the sender sent the aforementioned picture of flowers to recipient 412. Memory-curation server 414 would use the picture as a type of database key to identify the sender and analyze the sender's memories 450 in connection with the recipient's memories 428. Such analysis might yield a mutual affinity for a motion picture, such as "A Country Wedding." Both the sender and recipient might have saved the title to the movie, stored screengrabs of favorite scenes, or a note about the movie in their respective instances of memory-curation application 460/426. In that case, memory-curation server 414 might propose responding with a famous line from the movie, picture of a famous scene from the movie, a song from the movie, or even a link to retrieve the movie as a purchased gift. Thus, the disclosed technology includes proposing not only pre-existing gifts (such as material items) but also, for example, promptings of what to write to a recipient. In one embodiment, the disclosed technology considers senders memories 462/450, profiles 440, attributes 464/452, the recipient's memories 428 (including attributes 430), as well as information 420 from other users who have similar attributes to generate proposed messages that a user 412 (who does not necessarily have to be a recipient) might write to a sender 410. Such suggested writings might be inform a user 412 what to write on a greeting card (that might be personal to the original sender 410 turned recipient 410), what to say for a given situation (such as bereavement), what to write on a hang tag on a gift bag, a customization panel on a customizable ornament, or any other context where a sender might desire help to prepare a message for an occasion, a person, or combinations thereof. Thus, in one embodiment, in response to a recipient uploading an image of a received greeting card or note for example, the system, in turnkey fashion, proposes an item (such as a specific ornament or greeting card) along with a tailored proposed message and presents a "send now" button on a user interface of a user's device 412, such that the recipient 412 can send the proposed item and message with a single action, facilitated by the fact that the system was able to identify contact information of the sender via the sender's profile 420, which was identified based on the uploaded image, which was recognizable by memory-curation server 414 because it was aware of the content at creation by sender 410. Sending can be configured to be immediate or delayed.

The list (or portion thereof) of the proposed items is sent from memory-curation server 414 414 to recipient device 412. Recipient 412 could then opt to act on the list of proposed items, all from within memory-curation application 426 in one embodiment. Thus, if a proposed item was a customed thank-you note (customed by image or content based on the memory 462 send by sender 410), recipient 412 could send that customized note to sender device 410.

Figure 5A:
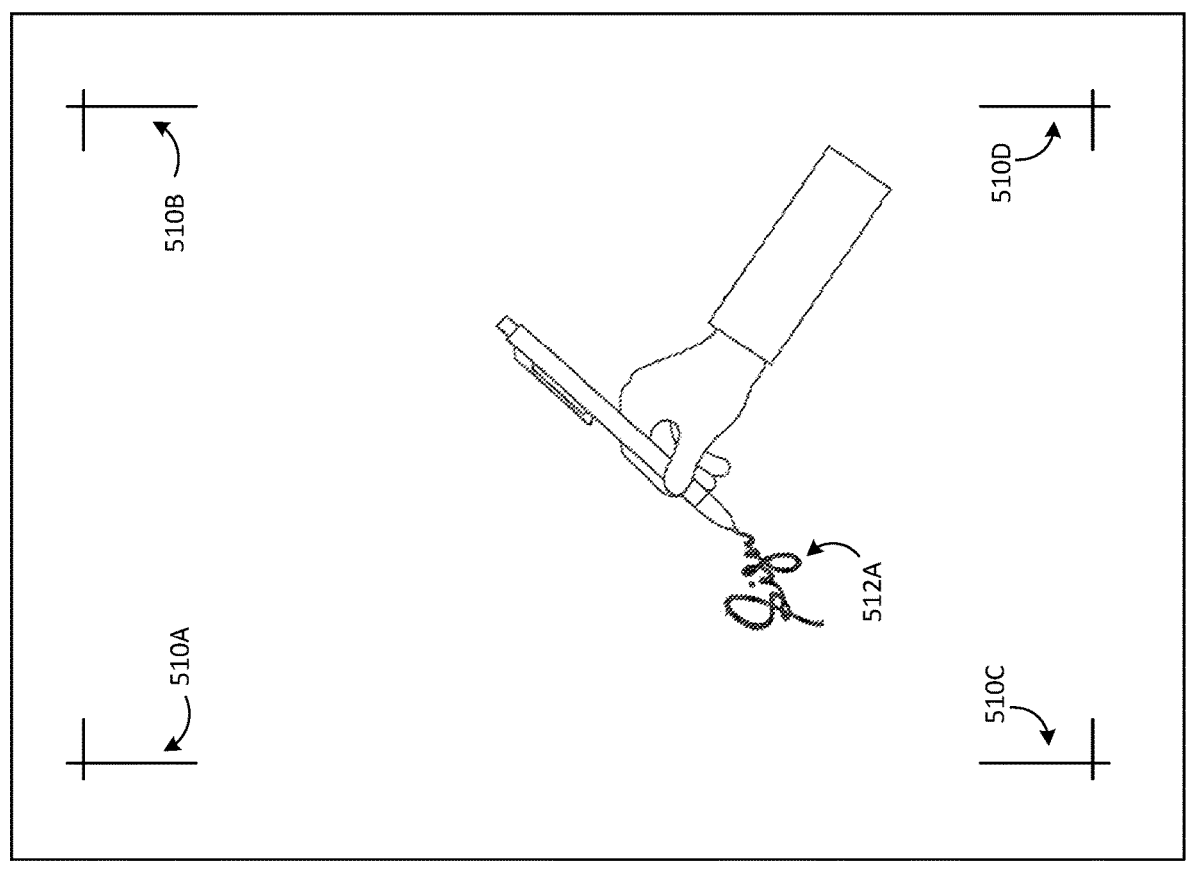
FIGS. 5A-5C depicts illustrative digital writings or pictures among fiducial markers suitable for practicing an embodiment of the disclosed technology.

In other embodiments, custom handwriting (or other uniquely identifiable image) is utilized. FIG. 5A shows a handwritten signature 512A. In one embodiment, the signature is withing a set of fiducial markings 510A-D that facilitate determine absolute size and position of the handwriting, which can help it be later identified by the memory-curation server 414. Thus, say a sender mails a physical card to recipient 412. The recipient could take a picture of the handwritten note 512A, upload it to memory-curation server 414, which would identify the sender using the note, and use the sender's memories data 450 or other correlated data (within data 420) to proposed a reciprocal response item.

Figure 5B:
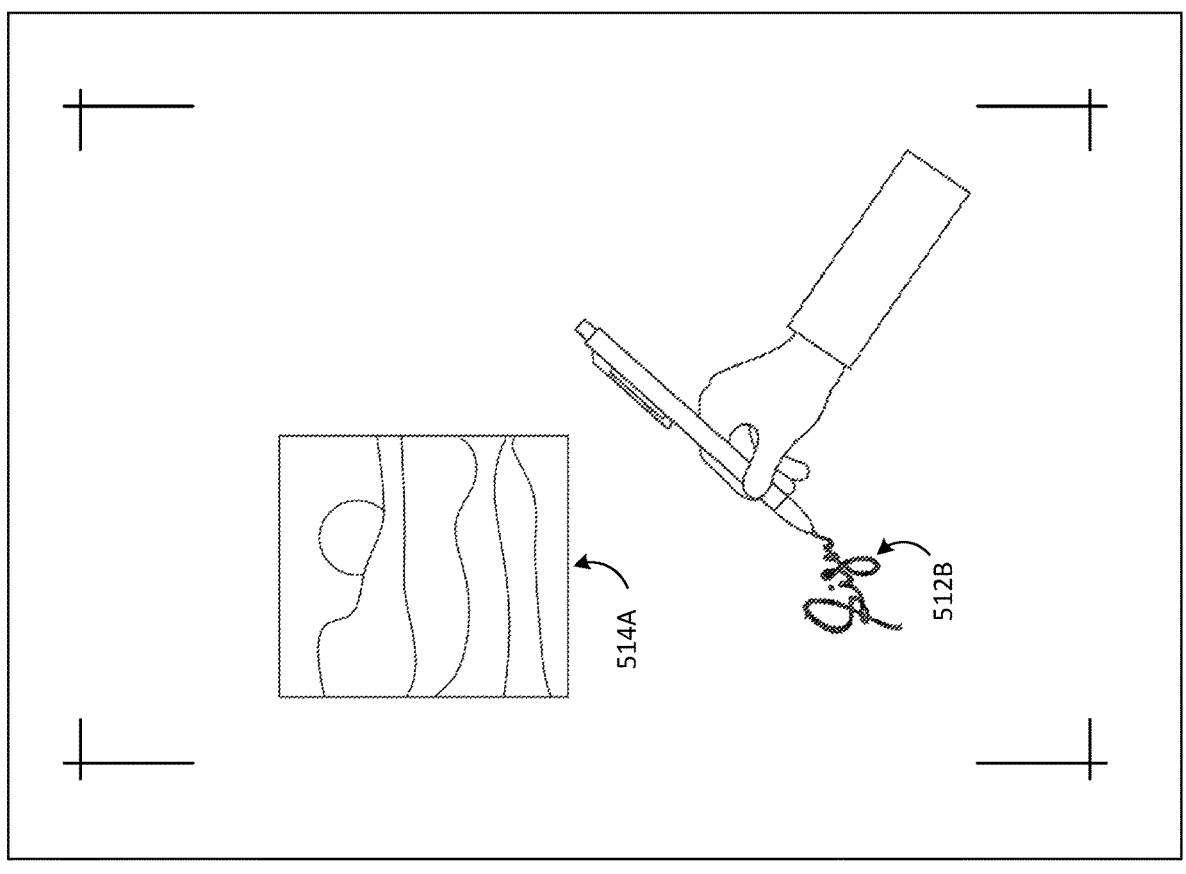

In another embodiment, as reflected in FIG. 5B, a signature 512B and image 514A are uploaded to memory-curation server 414 by recipient device 412 and attributes of both are used by memory-curation server 414 to prepare a proposed list of reciprocal ideas to recipient 412.

Figure 5C:
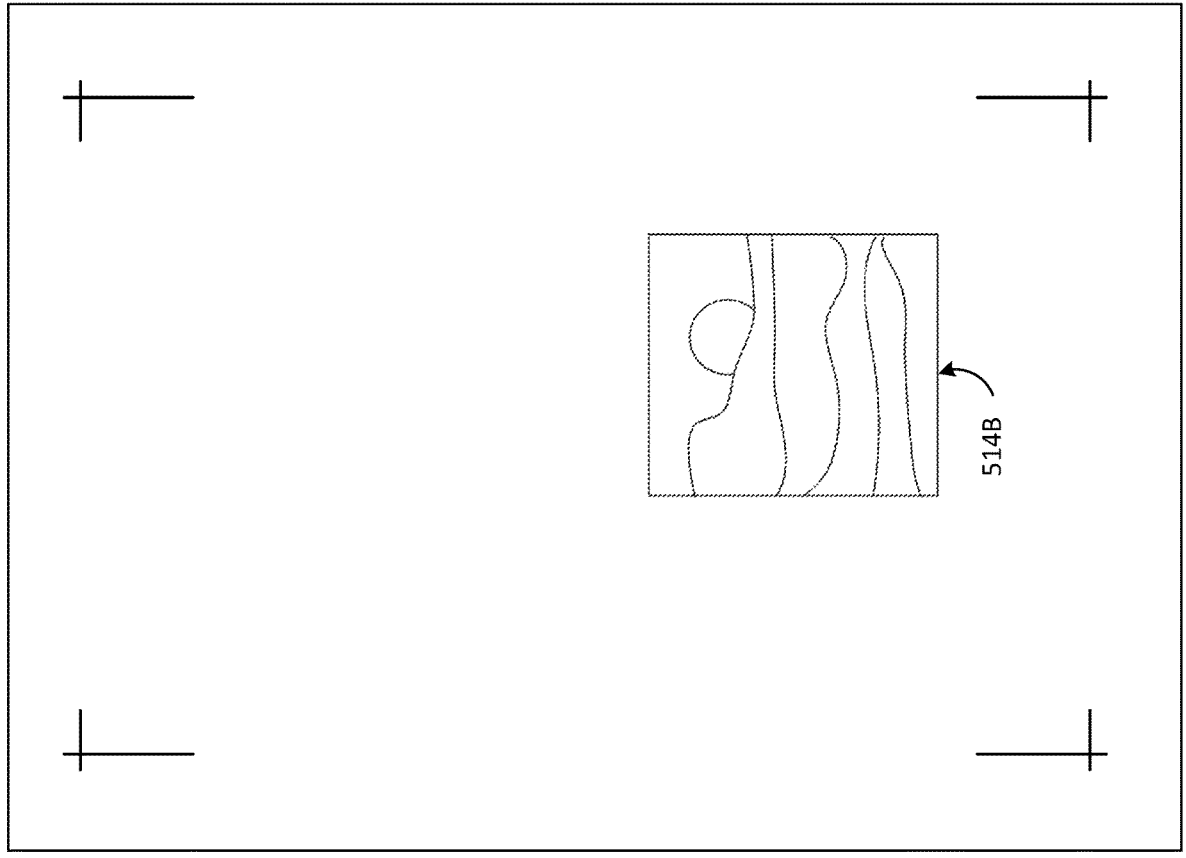

In still another embodiment, an image alone, such as image 514B of FIG. 5C, is used to the exclusion of a handwritten signature. In this embodiment, a handwritten signature is not used at all. For example, image 514 B might be a picture of the front of a physical card that was sent by a sender to a recipient. The card could have been prepared using data accessible by memory-curation server 414 so as to enable memory-curation server 414 to identify the image when it is uploaded by recipient device 412.

For example, the sender could have used memory-curation server 414 or a system coupled to memory-curation server 414 to select the card from an online platform that was further used to send the physical card to the recipient. Thus, the recipient would be able to upload an image of the card to precipitate identifying the sender and using the sender's attributes—or attributes of those who share attributes with the sender—to prepare the list of proposed reciprocal gift items.

Figure 6:
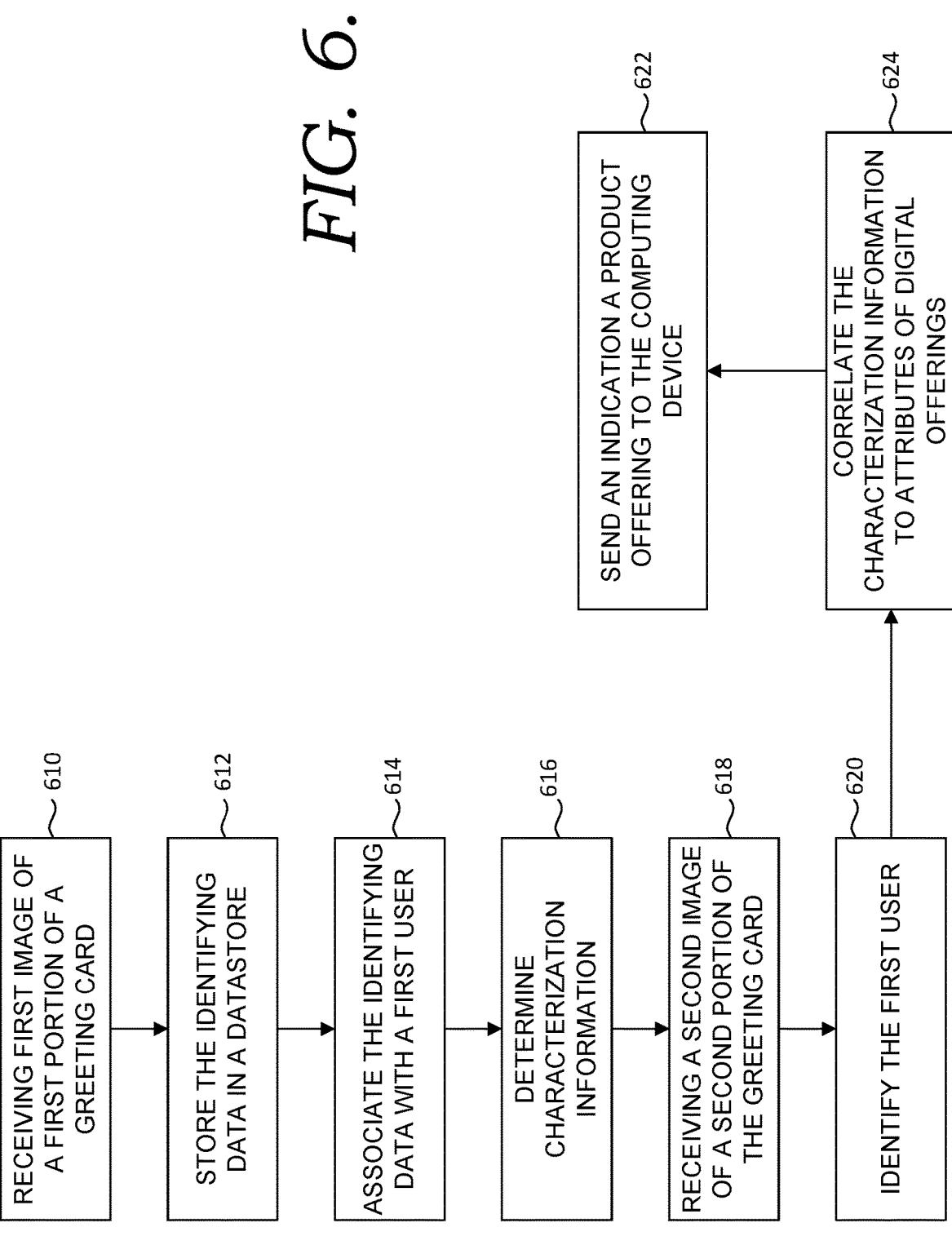
FIG. 6 depicts an illustrative method of proposing or providing context-based digital offerings based on a received gift or other item in accordance with an embodiment of the disclosed technology.

FIG. 6 depicts an illustrative method of one embodiment of the disclosed technology. At a step 610, a first image of a first portion of a greeting card (digital or physical) is received wherein the first image includes identifying data useable to identify the first image. For example, sending device 410 sends a memory 462 or greeting-card portion (512A, 514A, 512B, 514B, etc.). The first image could include a set of fiducial marks that are recognizable by a computer software program and allow the size and location of the image to be determined in absolute terms.

At a step 612, the identifying data is stored in a datastore, such as datastore 418. Storing the identifying data could include storing the first image itself or storing information about the first image.

At a step 614, the identifying data is associated with a first user. This can be accomplished by memory-curation server 414 using correlation data 446, image-feature extractor, correlation engine 434 or a combination thereof.

At a step 616, characterization information is determined from the first image. The characterization data characterizes aspects of the first image in one embodiment.

At a step 618, a second image is received from a computing device, such as from recipient device 412. The second image is of a portion of the greeting card and includes at least part of the first portion of the greeting card in one embodiment.

At a step 620, the first user is identified. Thus, for example, the sender associated with device 410 is identified. In one embodiment, such identification is carried out by utilizing the second image as a key to search the data in datastore 418 given that the image is unique and known by memory-curation server 414. Utilizing the second image to identify the first user is facilitated by comparing attributes of the second image and to attributes of the first image in one embodiment. The attributes of both the first and second images are stored via a computing device such as memory-curation server 414 in one embodiment.

At a step 620, the characterization information of the first image is correlated to attributes of one or more product offerings. Memory-curation server 414 can perform this correlation, which can be used to determine the product offerings.

At a step 622, an indication of at least one of the product offerings is sent to the computing device that sent the image data.

Figure 7:
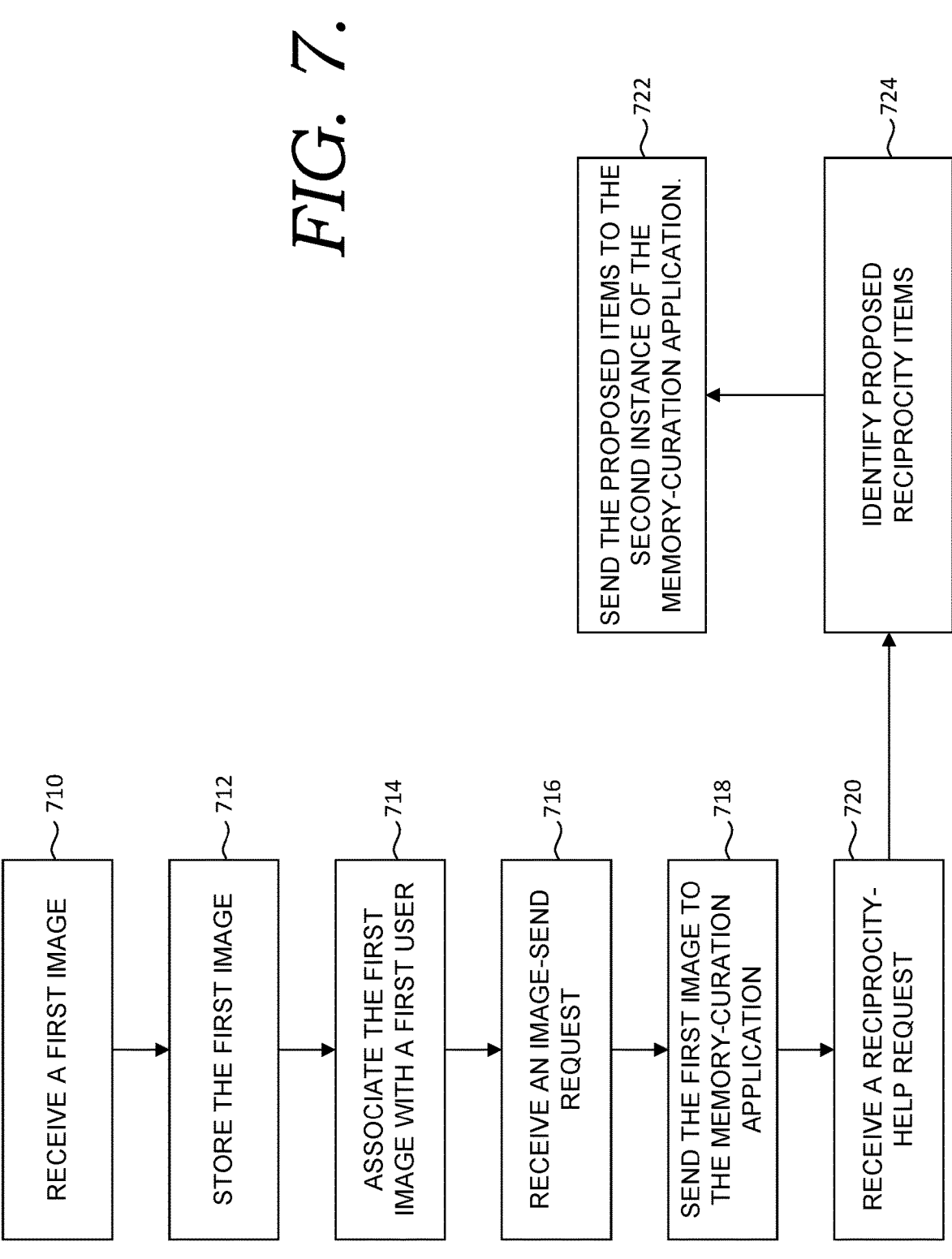
FIGS. 7-8 depict illustrative methods of proposing or providing reciprocal context-based digital offerings based on recipient information, sender information, or other historical demographic data in accordance with an embodiment of the disclosed technology.

FIG. 7 depicts another method of practicing the disclosed technology according to one embodiment. At a step 710, a first image is received from a first computing device, such as sending device 410. At a step 712, the first image is stored. The first image is stored in a datastore such as datastore 418 in one embodiment. At a step 714, the first image is associated with a first user. For example, the first image could be associated with the sender's profile 440.

At a step 716, a request is received to send the first image to a second computing device (such as to recipient device 412). The request is made via a first instance of a memory-curation application, such as via 460. At a step 718, the first image is sent to a second instance of the memory-curation application (e.g., 426) running on a receiving device, such as device 412.

At a step 718, a reciprocity-help request is received. This is a request to help facilitate a reciprocal giving option, reciprocal to the sender sending the initial memory. Thus, one method includes receiving from the second instance of the memory-curation application 426 a reciprocity-help request that includes a request to receive proposed items to send to the first user 460/410 in response to receiving the first image.

At a step 720, proposed items are identified that the recipient could send to the sender. One way proposed items are identified includes referencing a data store to determine the proposed items, where the datastore stores one or more of the following: past purchasing information about other users who have attributes in common with the first user; products rated highly by other users who have attributes in common with the first user; past purchasing information about purchases of the second user; attributes of the second user; attributes of the first user; attributes of other users who have attributes in common with the first user; attributes of other users who have attributes in common with the second user; or attributes of the first image.

The method of FIG. 7 can further include receiving from the second instance of the memory-curation application 426 a sending request to send at least one of the proposed items to the first user and facilitating the sending of the at least one proposed item to the first user. Thus, if memory-curation server 414 proposes sending a song to sender device 410, memory-curation application can provide for doing that. Or if memory-curation server 414 proposes sending a GIF tailored to sender 410, then the identified GIF is sent via memory-curation application 426 to memory-curation application 460.

And at a step 722, at least a portion of the proposed items is sent to the second instance of the memory-curation application 426. For example, one method includes sending at least one proposed item to the first user by referencing a user profile associated with the first user to obtain address information of the first user; in the case where the at least one proposed item is a digital item, sending the digital item to the first instance of the memory-curation application running on the first computing device or to a digital address associated with the first user; and in the case where the at least one proposed item is a physical item, sending the physical item to a physical address associated with the first user.

Figure 8:
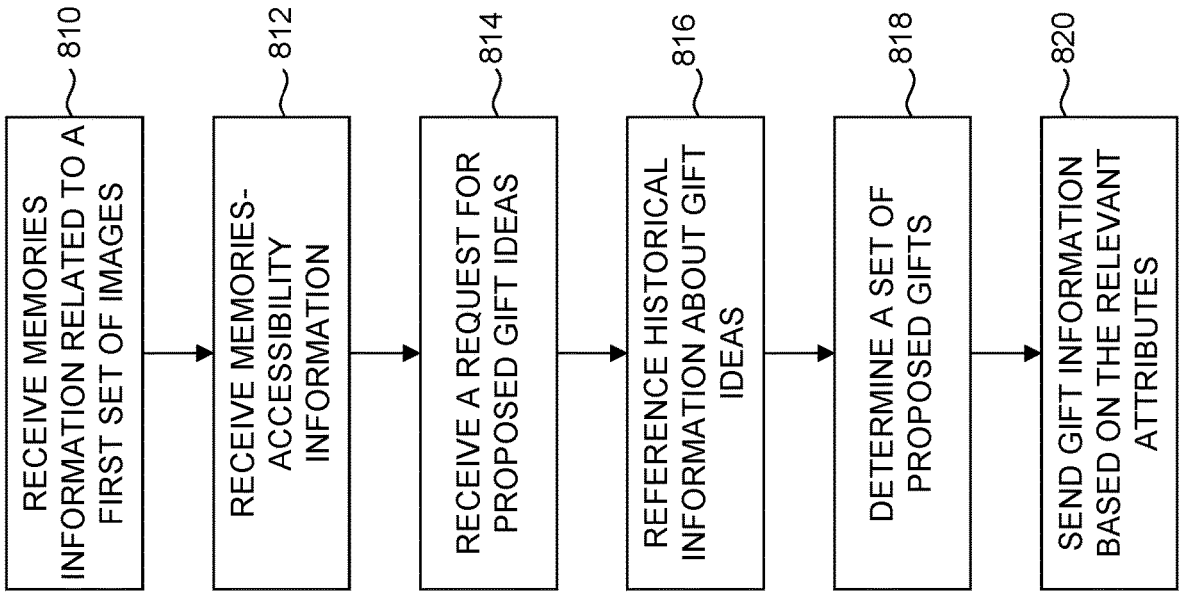

FIG. 8 depicts another embodiment of a method of the disclosed technology. The method is performed by computer-executable instructions that are executed by a computing device (which can include multiple constituent computing devices). The method includes, at a step 810 receiving at a memory-curation server (e.g., 414) memories information (e.g., 462) related to a first set of images that are associated with a first user, such as sender device 410 or memory-curation application 460. The memories information is received through a communications network (which can include multiple networks 416) and sent by a first computing device 410.

The method in this embodiment further includes, at a step 812, receiving at the memory-curation server 414 a privacy indication that indicates that at least a portion of the memories information is allowed to be accessed by others. Step 814 includes receiving at the memory-curation server 414 a request for proposed gift ideas relevant to the first user. The request is received from a second computing device such as recipient device 412 in one embodiment.

Step 816 includes referencing a datastore, such as 420, that stores historical information about gift ideas including attributes of potential gifts. Step 818 includes correlating attributes of the memories information with the attributes of the potential gifts to determining a set of proposed gifts. The correlating can also include considering attributes of a second user, wherein the second-user attributes are associated with a user of the second computing device 412.

Step 820 includes sending to the second computing device 412 gift information related to the set of proposed gifts. The method can further receiving a request to send to the first user 410 a desired item based on the gift information sent to the second computing device 412.

One embodiment of the disclosed technology facilitates a reciprocity path even when a gift giver wishes to remain anonymous. For example, a user can use the memory-curation application 460 to prepare a gift, such as a greeting card, including a physical card. The user signs the card selects a unique image, such as a custom picture for the front of the card as reflected in FIGS. 5A-5C. The user 460 requests that the card be sent to a recipient anonymously, e.g., with no return address, an abstracted return address, or the return address of a company. The recipient receives the card, scans the unique image via memory-curation application 426, which unique image is used as a key to identify the sender 440 without the receiver knowing. The receiver receives a list of proposed items developed according to the disclosed technology or selects something custom. The recipient 426 can then send the responsive item to the sender, all with the initial sender 410 remaining anonymous.

Associating memory representations with physical objects.

Some embodiments of the disclosed technology include a method of associating representations of memories with uniquely identifiable items and additionally or alternatively, presenting such representations based on the items, including, for example, based on receiving an image (e.g., picture) or the physical item.

For example, a locket that is characterized by unique attributes could contain a physical picture. In accordance with an embodiment of the disclosed technology, the Locket could also be associated with a digital asset, such as a picture, video, text message, audio file etc. A user could use a smartphone for example 2 scan the Locket, which would then present the digital asset (variously referred to herein as a digitized memory, although, of course, the digital representation does not have to be a memory per se).

Figure 9A:
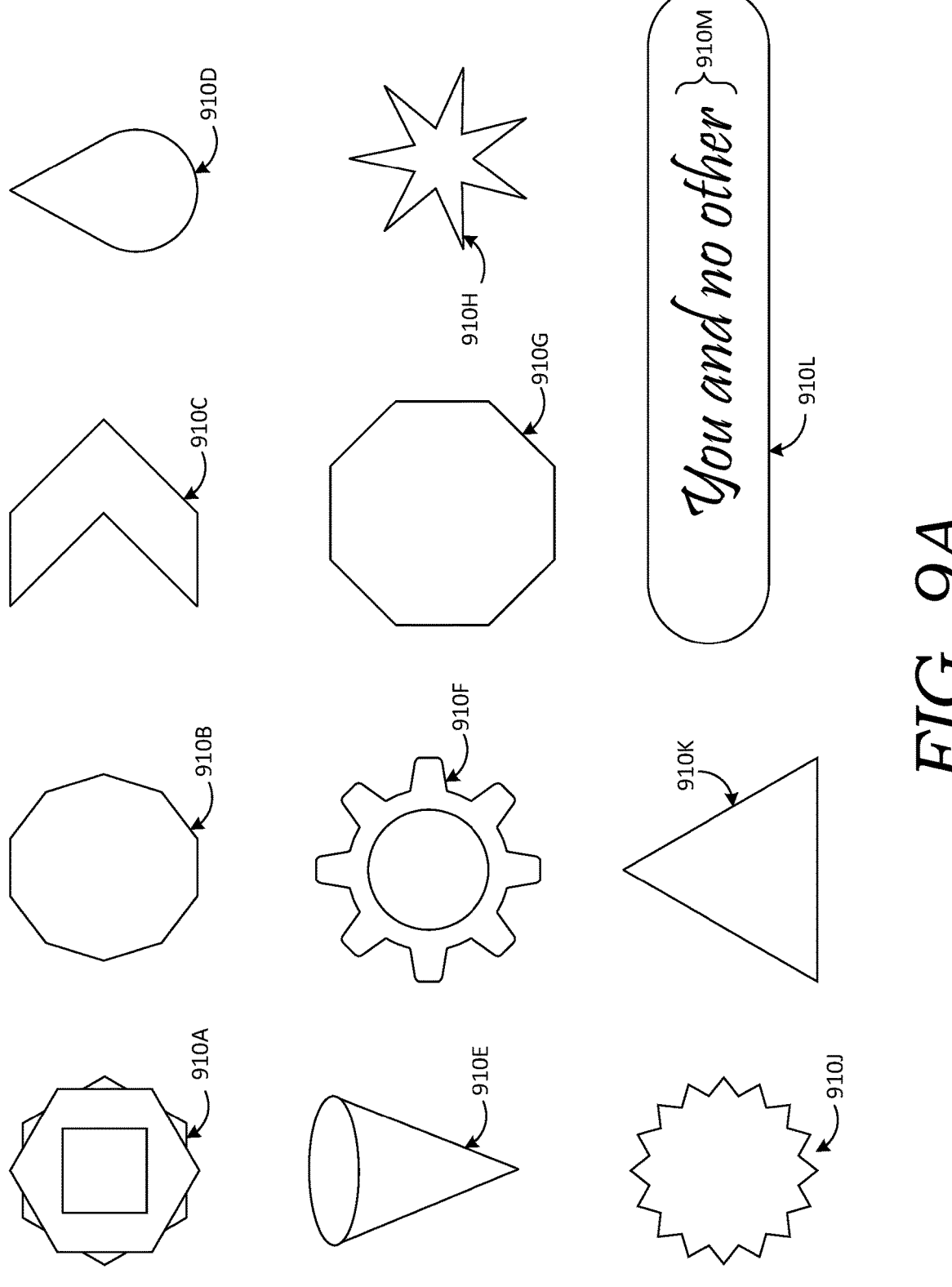
FIGS. 9A-9D and FIG. 10 depict illustrative shapes and objects that are uniquely identifiable and adapted to be associated with digital presentations in in accordance with an embodiment of the disclosed technology.

The uniquely identifiable physical item could take on a variety of forms. For example, it could be a picture frame, jewelry item, keychain, keepsake item, wearable object, etc. FIG. 9A depicts a few illustrative uniquely identifiable physical item 910A-L. The various shapes are illustrative and representative in nature. The physical item could have a different shape that is different than any of the items pictured in FIG. 9A. The geometric or color characteristics. Of. The physical. Item. Can alone, or in combination with other. Characteristics, make the item. Uniquely identifiable., which can include. Identifying a group. Or category of items. Jewelry item 910L includes an engraved handwritten message 910M, which Is usable in some embodiments to facilitate the unique identification of the physical item.

Other aspects of this disclosure will be described in the context of selecting one of the illustrative items 910A from FIG. 9A. For example, FIG. 9B depicts an illustrative uniquely identifiable physical item. In this embodiment, the item is composed of multiple layers or dimensional aspects. This embodiment includes a void 912. The void is suitable for receiving physical artifacts, such as a picture, textual message, etc. The multiple physical layers can contribute to the geometric aspects of the object so as to facilitate its unique identification.

Figure 9C:
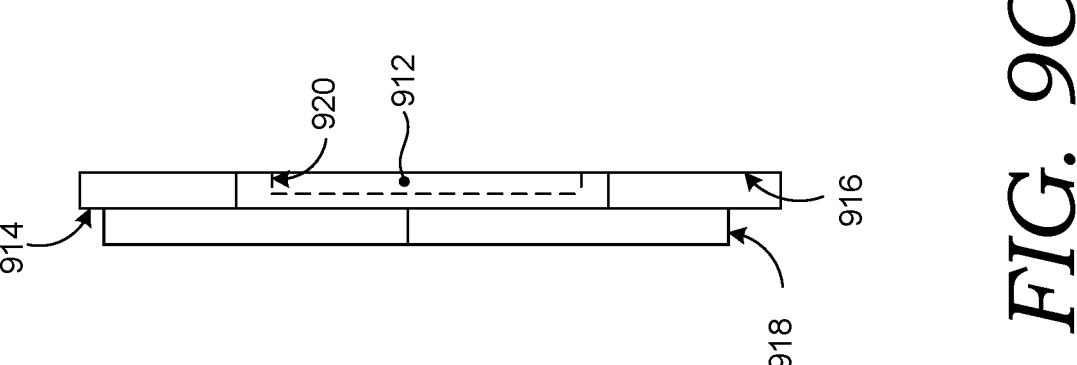
Figure 9B:
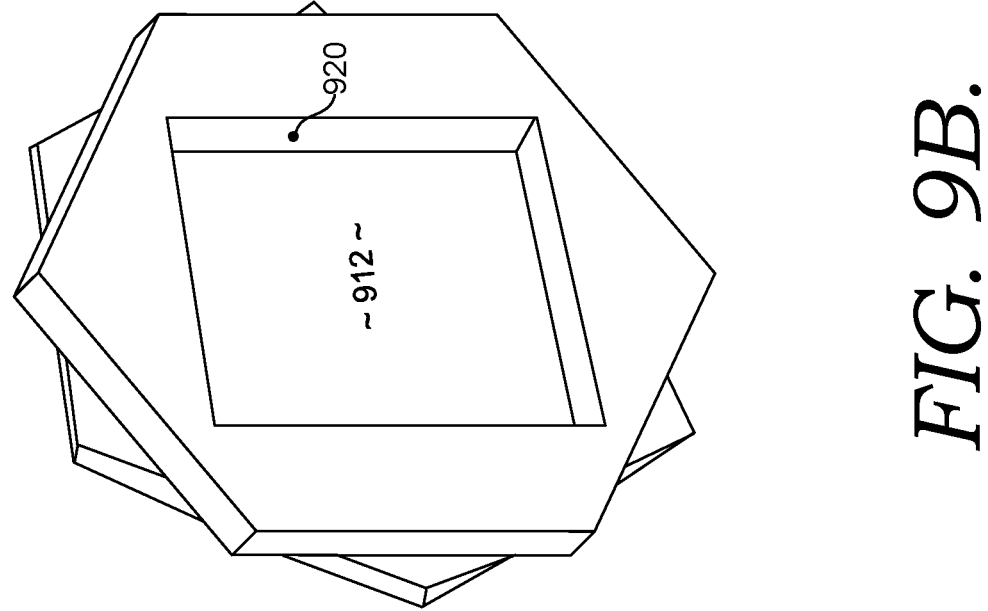
Figure 9D:
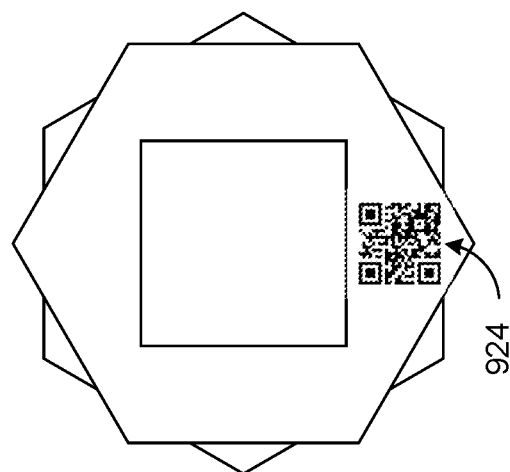
Figure 9D:
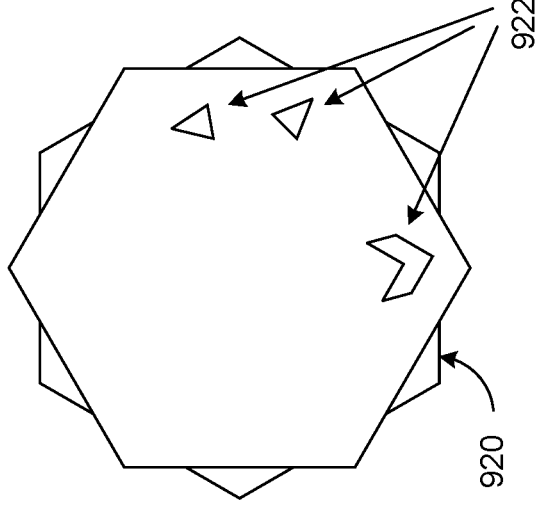
Figure 9D:
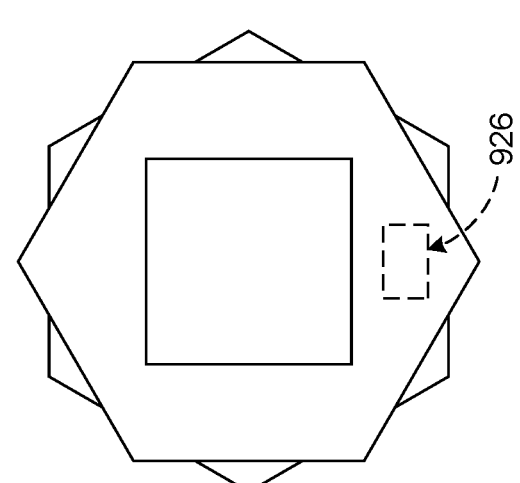

FIG. 9C Depicts a side view of the physical item of FIG. 9B. As can be seen in FIG. 9C, one embodiment of the item includes a rear surface 914, a front surface 916, and a second layer 918. In the embodiment shown, void 912 is represented by broken lines. Thus, front surface 916 can include avoid defined by a raised edge 920, which is also shown in FIG. 9B. In some embodiments, void 912 is not included.

FIG. 9 depicts illustrative characterizations that facilitate the unique identification of a physical object in accordance with embodiments of the disclosed technology. For example, the physical item could include a set of markings 922. Markings 922 could take a variety of forms. They do not need to be two-dimensional or shapes as illustratively shown. Rather, they could be a series of markings that are understood by an identification system so as to uniquely identify physical object 920.

In another embodiment, a QR code 924 is usable to facilitate the unique identification of the physical object.

And still another embodiment, technology such as near field communications technology could be employed. For example, an NFC tag 926 could be embedded in the physical object such that it facilitates or helps facilitate the unique identification of the physical object when it is scanned.

Figure 10:
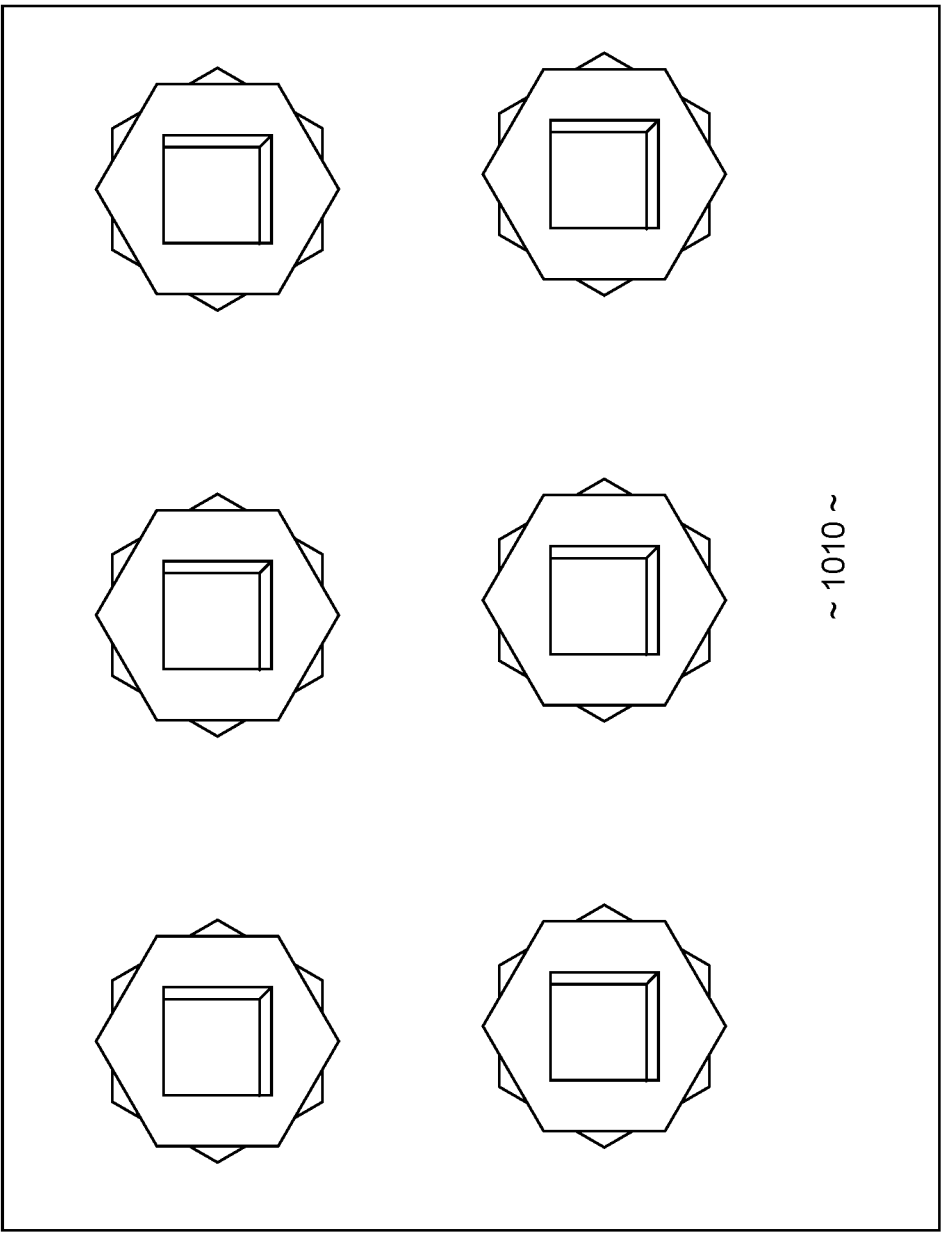

One embodiment of the disclosed technology allows a user to select a uniquely identifiable physical object and associate a digitized memory with it. FIG. 10 depicts an illustrative presentation 1010 that presents various physical objects that can be selected and customized. Presentation 1010 can be presented on a user device such as a personal computer, tablet, smartphone, etc. Display 1010 allows a user to select an object to be customized period FIG. 52 depicts an illustrative operating environment suitable for practicing one or more embodiments of the disclosed technology. An identification system 5210 identifies representations of uniquely identifiable physical objects, such as object 5232. In one embodiment, the identifying characteristics of item 1132 are known by and inputted into identification system 1110 such that those same characteristics are usable to identify item 1132 when it is later scanned.

Identification system 1110 is coupled to a data store 1112, which, in some embodiments stores attributes of the various physical items and/or links between physical items and their respective digital assets. It some embodiments, a physical item is linked to multiple digital assets, each of which can be presented or cycled through on a client device such as device 1114 or 1116.

In one embodiment, client divides 1116 is a personal computer. It could also be a tablet or smartphone. It includes a client application 1118, which takes the form of a set of computer executable instructions that are stored on non-transitory computer storage media. The devices and other hardware take the form of hardware items as described in connection with FIG. 1 in some embodiments. For illustrative purposes, client device 1114 is depicted as a smartphone. It also includes a set of computer-executable instructions 1120. Client application 1120 can include captured utility 1122, user-interface controls 1124, and settings 1126.

Capture utility 1122 facilitates the capturing of a representation of physical item 1132. Capture utility 1122 works with a camera of NCF reader, for example, of client device 1114. Application 1120, by way of user-interface controls 1124 can present a variety of controls on a user interface of a display of client device 1114. For example, an illustrative control is shown by reference numeral 1128, which takes the form of a digital button. Control 1128 could also be a link, text item, gesture control, and the like.

When control 1128 is acted on, a capture window 1130 is presented on a display of client device 1114, which, for identification purposes, is represented by numeral 1114A. Numerals 1114A and 1114B depict different phases of execution of application 1120. Capture window 1130 provides a border to help guide a user to take a capture of physical item 1132. Numeral 1134 depicts a captured digital representation of physical item 1132.

Representation 1134 is then usable by identification system 1110 to identify the corresponding digital asset 1138 and present it on client device 1114B. For example, perhaps physical item 1132 was given by a grandparent to a grandson who is associated with client device 1114 or client application 1120. The grandparent could have associated his watch with the physical device 1132, which takes the form of a picture frame that sits beside the child's bed. When the child uses his or her phone 11142 to scan device 1132, it 1114 presents an image of the grandfather's watch 1138 to remind the grandchild of his grandfather. Instead of a watch, digital asset 1138 could be a text message, words of wisdom, digital greeting card, picture of the grandparent with the child, a song, or combinations thereof.

Figure 11:
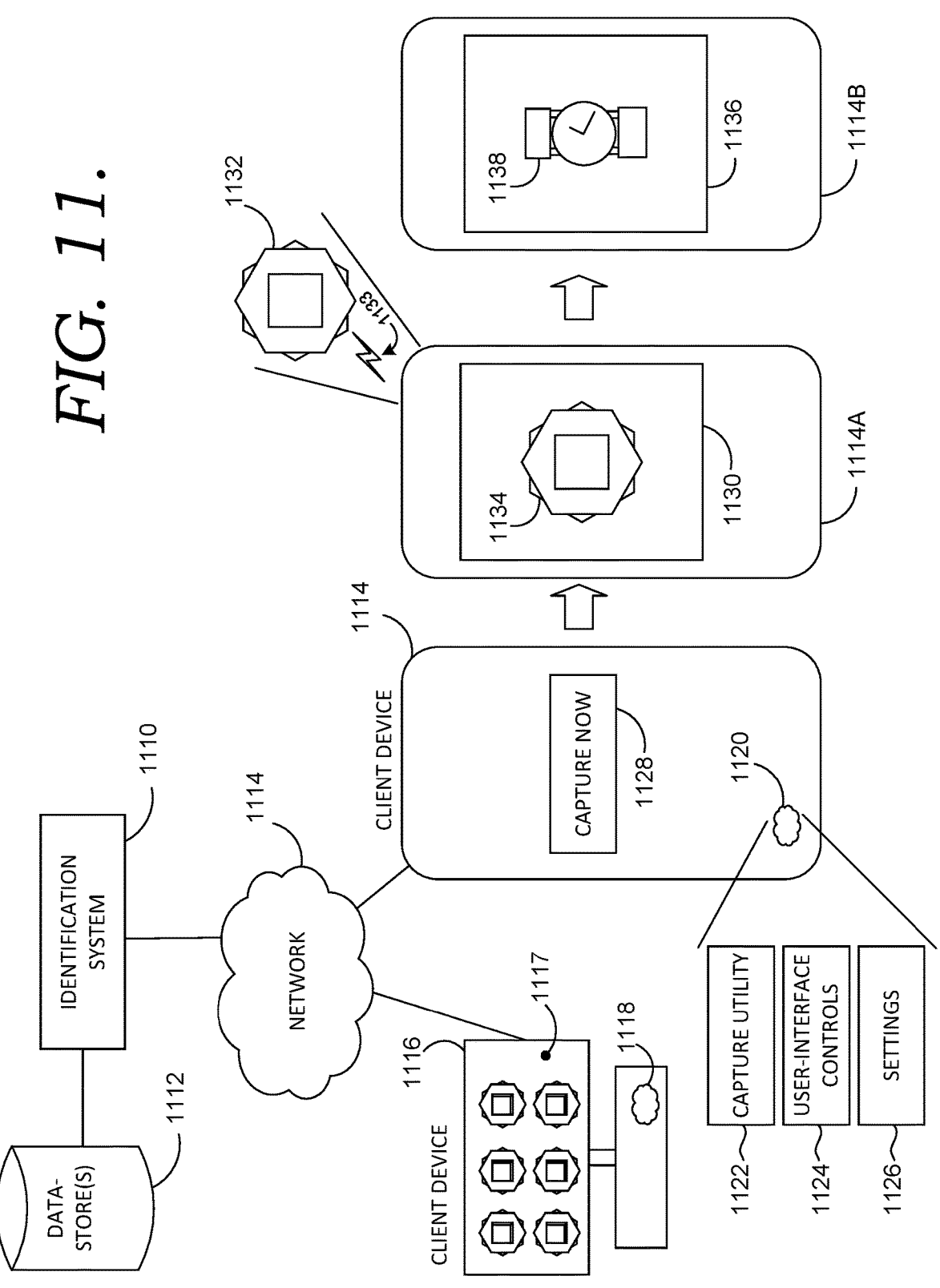
FIG. 11 depicts an illustrative operating environment for practicing an embodiment of the disclosed technology.
Figure 12:
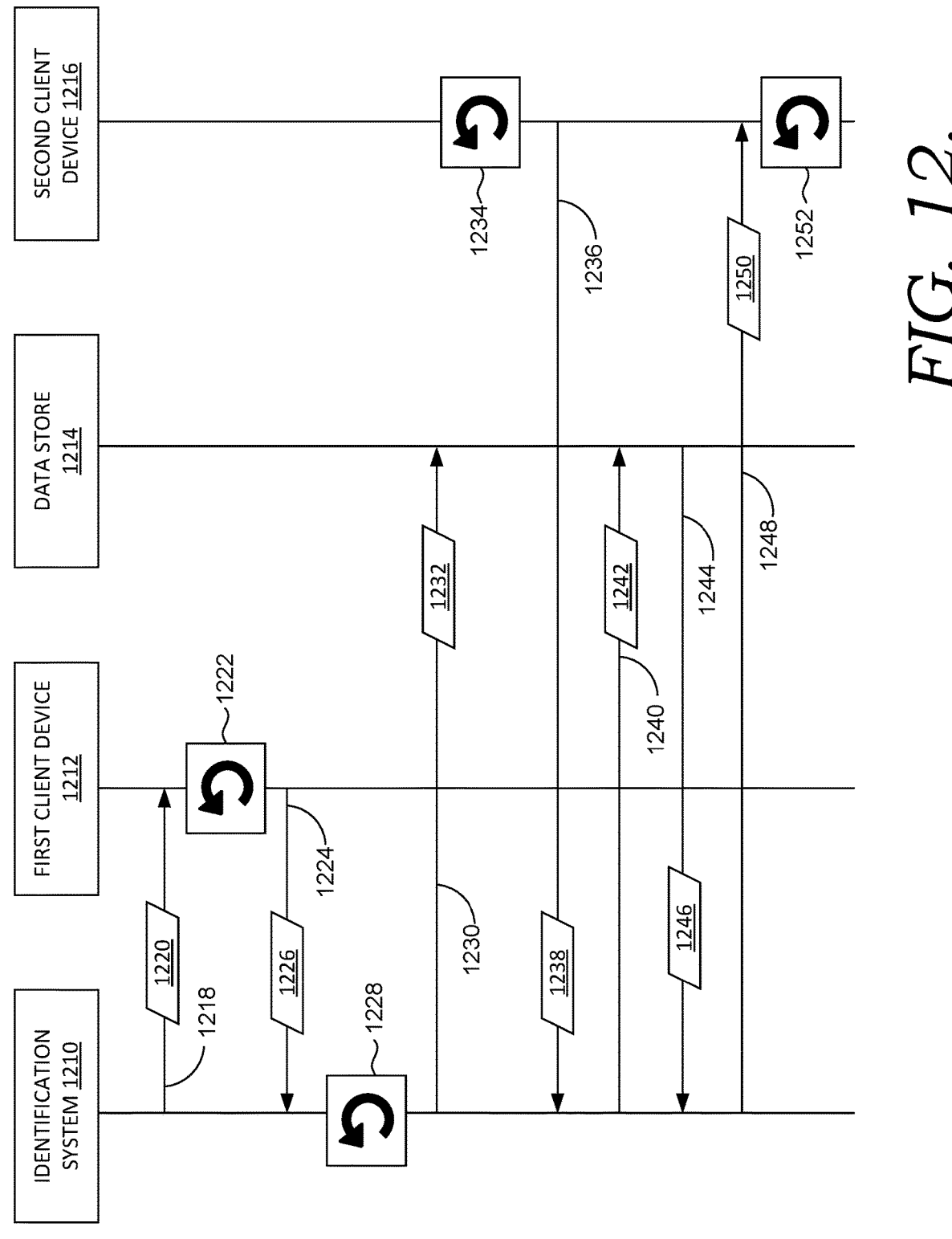
FIG. 12 depicts an illustrative data flow for practicing an embodiment of the disclosed technology.
Figure 13:
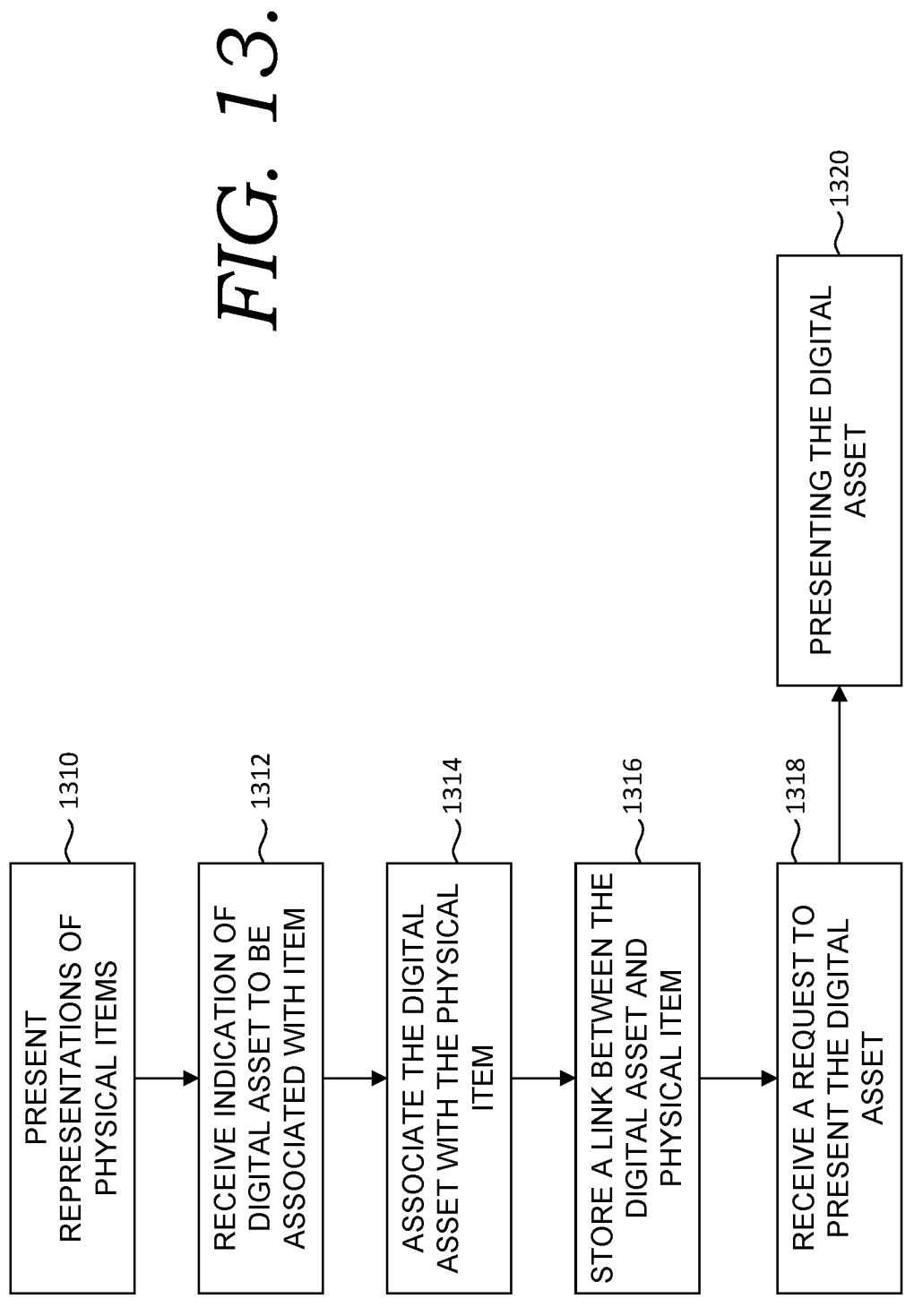
FIGS. 13-15 depict illustrative methods for presenting a digital asset associated with a physical object in accordance with an embodiment of the disclosed technology.

FIG. 12 depicts an illustrative method in accordance with an embodiment of the disclosed technology. Four illustrative components are shown: identification system 1210, a first client device 1212, a datastore 1214, and a second client device 1216. These devices are the same as or similar to the correspondingly named devices in FIG. 11. "First" and "second" do not implicate any order or carry a temporal connotation; rather, they are used simply to be able to refer to various components (as is the case wherever such terms are used herein.

At a step 1218, identification system 1210 sends information 1220 to a first client device 1212. The information facilitates presenting on a display of client device 1212 a representation of a uniquely identifiable physical item. Identification system 1210 is configured to identify the physical item, including upon a subsequent presentation of an image of the physical item.

At a step 1222, first client device 1212 displays one or more representations of corresponding physical items on a display of first client device 1212. In one embodiment, the display is similar to the display depicted in FIG. 10.

At a step 1224, identification system 1210 receives an indication 1226 of a digital asset to be associated with a selected physical item. For example, first client devise 1212 could have presented various physical items (as used herein, technically referring to representations of corresponding physical items) to a user. A user would then select one of the representations of a physical item to become associated with a digital asset, causing client device 1212 (or additionally system 1210) to receive and the indication of a selected physical item. For example, if a user wished to personalize a picture frame, then the user would select a picture frame. Similarly, if a user desired to personalize a jewelry item, then the user would select a jewelry item. And although FIG. 12 depicts a selection indication 1226 as being sent from first client device 1212 to identification system 1210, in other embodiments, first client device 1212 itself receives the indication and facilitates the association of a digital asset with a physical item. Receiving an indication can include receiving a selection indication of one of the images of the items, by a tap, click, etc.

In one embodiment of the disclosed technology, at a step 1228 identification system 1210 associates the digital asset with the uniquely identifiable physical item, thereby creating a digital link between the digital asset and the physical item. In one embodiment, this happens remotely via a server system such as identification system 1210 if a user is operating in a web-based environment. Alternatively, it can happen locally on a client device, such as a smartphone.

One embodiment of the method continues at a step 1230 where the link 1232 between the digital asset and the physical item is stored in datastore 1214. Alternatively or additionally, datastore 1214 stores identifying indicia of the digital asset and identifying indicia of the corresponding physical item, which is within the scope of storing a link between the two as described herein.

At a step 1236, a request 1238 is received tat identification system 1210 to present a digital asset. This request could also be received at the client device 1236 itself. By way of example, any user of the app (e.g., 1118, 1120, etc.) could use a client device to scan a uniquely identifiable physical item according to an embodiment of the disclosed technology. Maybe a daughter scans (e.g., takes a picture) of a picture frame using her smartphone. The phone itself could retrieve the digitized memory associated with the picture frame, or it could send the scan to a server 1210, which accesses 1240 a digital asset via datastore 1214.

Identification system 1210 receives 1244 the digital asset 1246 and sends 1248 it 1250 to the client device 1216, which renders it at a step 1252. This can include showing a picture, playing a sound or song, presenting a text message, playing a video, etc.

FIG. 54 also depicts a method of an embodiment of the disclosed technology. With continuation reference also to FIG. 11, step 5410 includes presenting on a display of a computing device (e.g., 1116, 1114) a representation 1117 (see also FIG. 10) of one or more uniquely identifiable physical items that are identifiable by identification system 1110. Step 5412 includes receiving an indication of a digital asset to be associated with the selected physical item. For example, a user could tap one of the physical items shown on user interface 1117 and then, incident to a prompt, tap on a picture or video, type message, record a recording, identify a song, etc. that is to be tied to the physical item.

Step 5414 includes associating the digital asset with the physical item. This can be carried out by storing the items in a database with a common identifier. It can also include storing a link that links the digital memory with the physical item in datastore 1112, which is accessible by identification system 1110 such that the digital asset is retrievable incident receiving a request to present the digital asset based on a subsequent digital capture of the uniquely identifiable item.

Step 5418 includes receiving a request to present the digital asset. For example, a smartphone captures 1133 a physical object 1132. The step of capturing 1133 could include taking a picture of item 1132 as well as scanning an NCF tag or other reception of various forms of data (e.g., beyond image data). The representation 1134 of the physical item 1132 is useable (locally or remotely) to present, at a step 5420, the digital asset 1138 that corresponds to the physical item. Presenting the digital asset can include receiving a representation of the physical item, using identifying attributes of to physical item to identify the digital asset, and retrieving the digital asset.

Physical item 1132 could be a piece of jewelry, a picture frame adapted to receive a photograph, an electronic device adapted to play an audio or video message, a bottle, a packaging, a container, a keychain, and the like.

The item 1132 could be uniquely identifiable by way of a set of specific geometric characteristics, a set of specific markings, one or more custom content items that are physically associated with the item, a specific color, a near-field communication (NFC) tag, a QR code, and the like, and combinations thereof.

Figure 14:
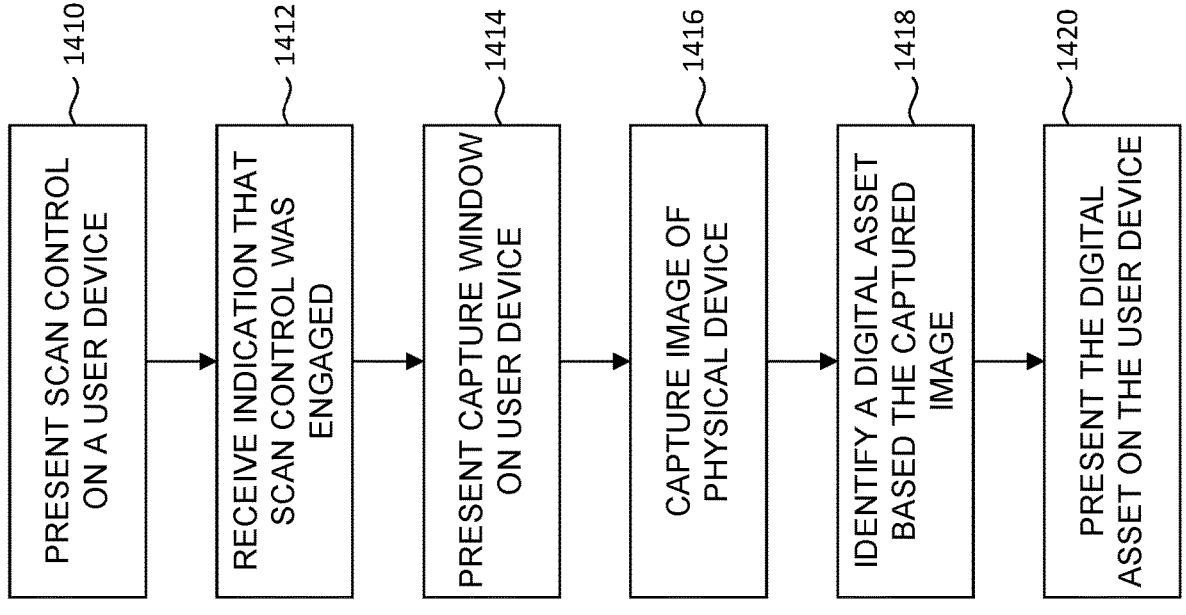

FIG. 14 depicts another method in accordance with an embodiment of the disclosed technology, including, in particular, a show a digitized memory (digital asset) in response to capturing a representation of a uniquely identifiable physical item. Step 1410 includes presenting via a computing device a scan control that is useable to initiate capturing an image of a physical uniquely identifiable item. The scan control 1128 can be a digital button, a digital link, a textual command, a gesture option, a handwritten message, a physical button, or an audio command.

Step 1412 includes receiving an indication that the scan control has been initiated—for example a button pressed, a link followed, a gesture occurred, etc.

Step 1414 includes presenting a capture area 1130 on the display 1114A. The capture area 1130 is defined by a capture boundary in one embodiment. Step 1416 includes capturing 1133 an image 1134 (and/or other data) of the uniquely identifiable item 1132 within the capture boundary, resulting in a captured image 1134. Step 1418 includes identifying a digital asset associated with the uniquely identifiable item based on the image. Step 1420 includes presenting the digital asset 1138 via the computing device 1114B.

Figure 15:
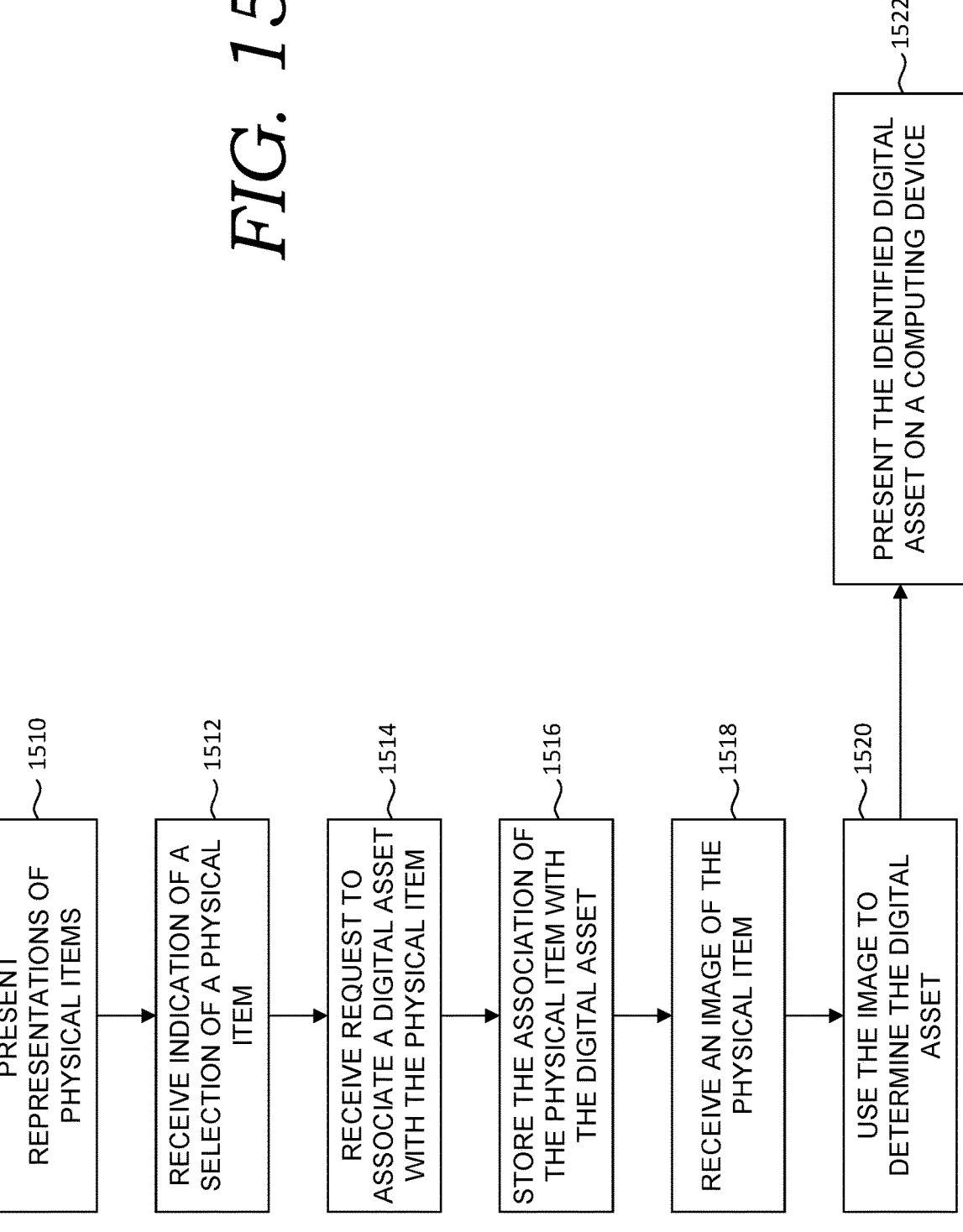

FIG. 15 depicts another method in accordance with an embodiment of the disclosed technology, including, in particular, a way to associate a uniquely identifiable physical item with a digital asset. Step 1510 includes causing a set of representations 1117 of physical items to be presented on a computing device 1116, where each of the physical items is uniquely identifiable. Step 1512 includes receiving an indication of a selection of one of the representations of the physical items. For example, a user might tap or click on one of the objects presented via interface 1117.

Step 1514 includes receiving an indication of a digital asset to be associated with the selected physical item. A user could select a picture, a video, a song, write a message, record a sound, a link to a movie or to a song, or combinations thereof. The digital asset is associated with the selected physical item, which, in some embodiments, creates a digital link between the digital asset and the selected physical item(s).

Step 1516 includes storing the link in a datastore accessible by the identification system such that the digital asset is retrievable incident to receiving a scan of the uniquely identifiable physical item.

Thus, step 1518 includes receiving a request to present the digital asset. The request can includes a reference to a representation of the physical item, such as a picture and/or other data. Step 1520 includes utilizing the representation of the physical item to identify the digital asset. And step 1522 includes providing instructions to present the digital asset, such as via a computing device 1114B.

Digital Greeting Cards

Figure 16:
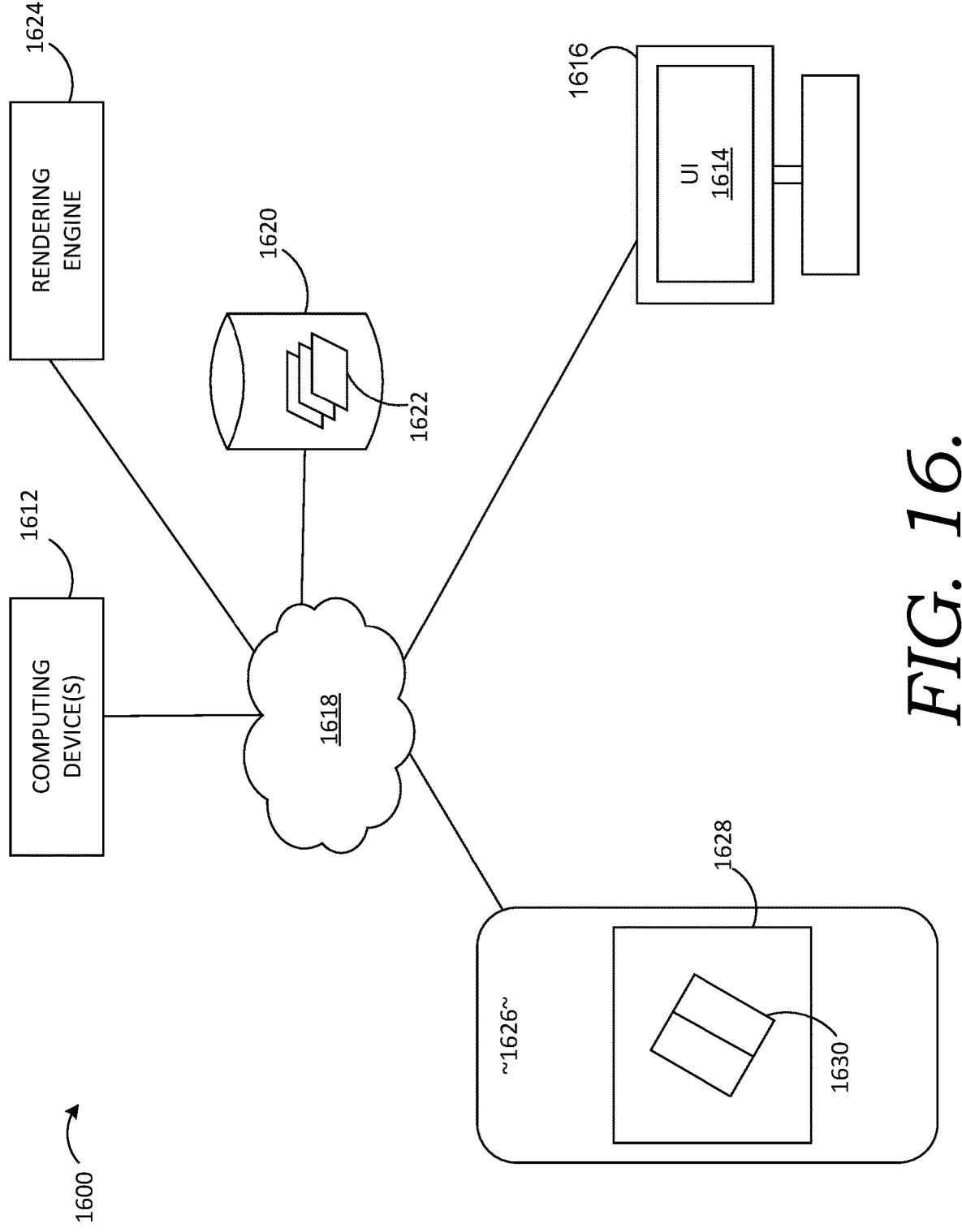
FIG. 16 depicts an illustrative system for presenting a digital greeting to a recipient in accordance with an embodiment of the disclosed technology.

Turning now to FIG. 16, an illustrative system 1600 for presenting an animated digital greeting card (for example) is provided. System 1600 is likewise useable to present animations of other objects as well, such as invitations, postcards, notes, papers, and the like. In one embodiment, one or more computing devices 1612 facilitate the presentation of a user interface 1614 on a remote computing device 1616. User interface 1614 is useable to receive personalization options for customizing a digital-greeting-card animation.

For example, a user might indicate a desired background, message, picture, video, gift link (such as a QR code, unique string of characters, barcode, etc.), game, sound, song, or combinations thereof. Further, a user might indicate when the greeting is to be delivered, a set of conditions that must first be satisfied to reveal the greeting (such as a presence in a geographic location, correctly answering a series of questions, solving a puzzle, waiting one or more periods of time, etc.). All of the aforementioned attributes and features take the form of personalization data 1622 in one embodiment.

One or more datastore(s) 1620 are coupled to the computing device(s) 1612 in one embodiment. Datastore 1620 stores personalization data 1622 consistent with the personalization options. Datastore 1620 can be coupled to computing device 1612 via network 1618, which, as with all networks described herein, may be one or more networks. Personalization data 1622 is usable to create an animated 3D card.

In one embodiment, rendering engine 1624 (which could be one of the computing devices 1612 or embodied as software as a set of computer-executable instructions) is coupled to datastore 1620. The rendering engine generates one or more textures based on personalization data 1622 and applies the textures to a 3D model of a greeting card, thereby enabling the rendering of an animated 3D greeting card 1630 on a display 1628 of a remote device 1626 when requested. The animation 1630 visualizes at least a portion of personalization data 1622.

Figure 17:
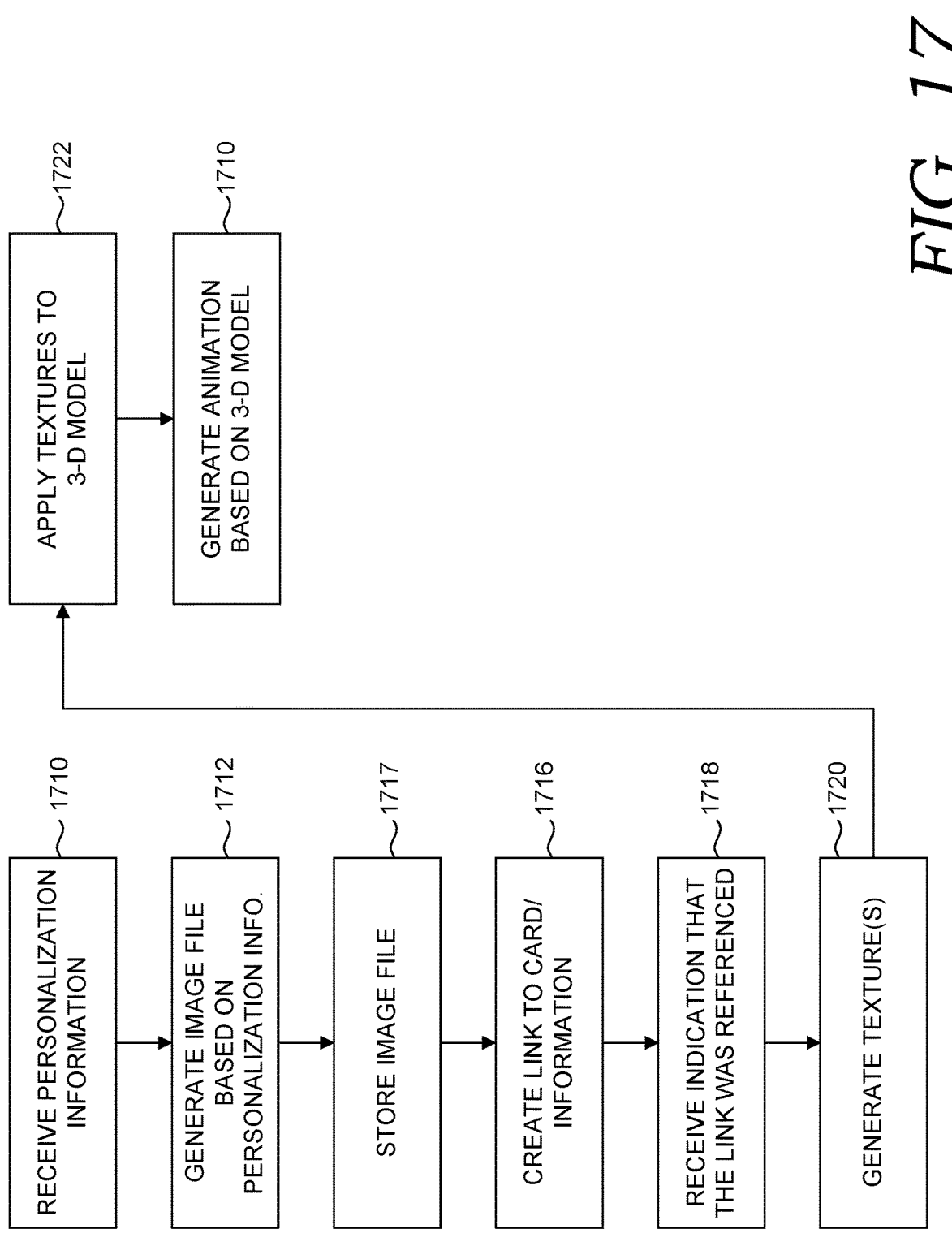
FIGS. 17-18 depicts illustrative methods of presenting a digital greeting to a recipient in accordance with an embodiment of the disclosed technology.

Turning now FIG. 17, an illustrative method of creating and presenting an animated greeting is provided. At a step 1710, personalization information is received that useable to personalize a greeting, such as a greeting card, thank-you card, note, and the like. At a step 1712, the system generates an image file bas on the personalization information. In some embodiments, more than one image file is generated. If, for example, a user customized a card with desired backgrounds, foregrounds, animations, messages, etc., then an image file is generated consistent with those characterizations. The image file could be vector format, JPEG format, a bitmap, .png, or other format.

In some embodiments, the personalization options are tied to a physical card that is available to be physically printed, and the disclosed technology extends the reach of such a physically printable card by providing a way to send a digital version of that card. In such an embodiment, the physical attributes of the card are known (e.g., a number of folds, a card width, a card height, a paper type, a paper thickness, etc.).

And those can be used by system 1600 to present options associated with a digital counterpart of that card without having to create the digital counterpart from scratch (e.g., without the information about the physical card).

At a step 1717, the image file is stored, in, for example datastore 1620. At a step 1716, a link is associated with card information. The link could be a custom URL (uniform resource locator), hyperlink, QR-code, etc. The card information could include the generated image file, the personalization information, and/or other information, such as metadata about the project or other information, such as a gift code (such as QR code), video, sound, or other.

The system facilitates sending the card to a recipient. For example, system 1600 could send a specific URL to an intended recipient via email, text, a dedicated app, push notification, or other. At a step 1718, the system receives an indication that the generated link has been referenced. For example, a recipient may have clicked on the link or taken a picture of a QR code (if the link was in that form).

Thus, a front-end portion of system 1600 could request data 1622 stored in datastore 1620 to be used. In one embodiment, the data is confirmed to a JSON structured format suitable for use in an animation runtime. An API retrieves personalization data, enabling a JSON transformation, that supplies data to an animation runtime environment in one embodiment.

At a step 1722, at least a portion of the card information is used to generate one or more textures. Image information is downloaded and converted to a texture format useable the runtime's rendering 1624 pipeline. At a step 1724, one or more textures are applied to a 3D model of a greeting card. For example, the generated texture is applied as the primary texture of a material applied to a 3D model of a card contained within the runtime. Once the relevant data is loaded, converted, and applied, the animation is ready for playback, as indicated by a step 1710, which includes generating a digital animated version of a greeting card from the 3D model, wherein the animated version presents a representation of the image file and consistent with the personalization information.

Figure 18:
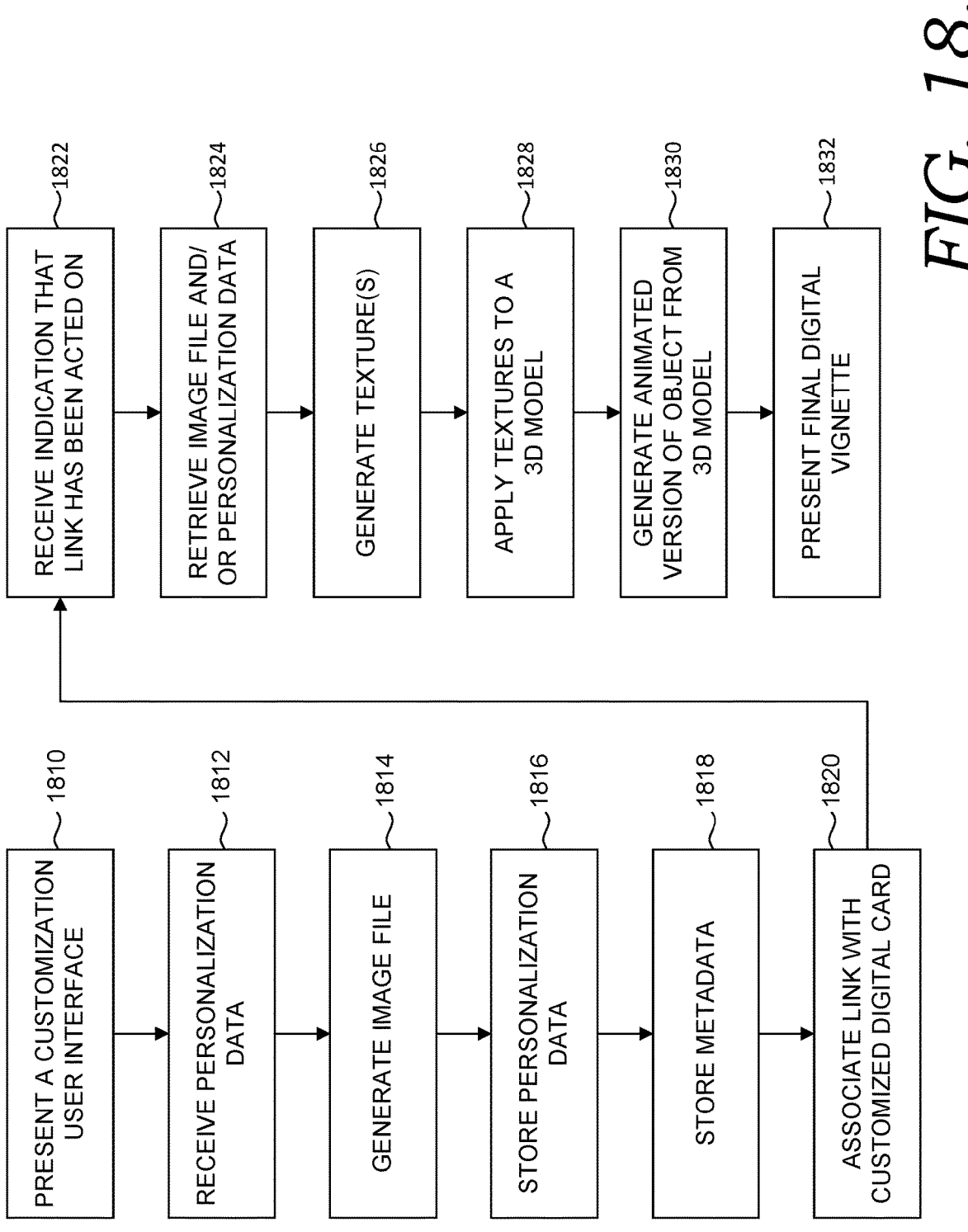

FIG. 18 presents another illustrative embodiment of a method for generating an animated version of a greeting, such as a card or other object. At a step 1810, system 1600 presents a user interface that enables customization of a greeting card. The user interface is presented on a remote computing device, such as devices 1626 or 1616 in one embodiment.

At a step 1812, personalization information is received that is useable to personalize the greeting card. Reception of the personalization information is facilitated by computing device 1612 in one embodiment. The personalization information can take on a variety of forms. It could include a greeting message, textual content, a code linking to a monetary value (such as QR code that allows a monetary value to be conveyed to a recipient), a link to a game, a video, a sound recording, a picture, etc.

In the case of a QR (or other) code that conveys value, a representation of the value conveyance could be illustrated on the user interface 1614 of the remote device 1616/1626 so that recipients know they have received it. For example, upon viewing the animated greeting, a visual dollar sign is shown on UI 1614 as sliding into a giftbox.

The personalization information could also include temporal information, such as a countdown that requires the recipient to wait a set amount of time to receive the digital greeting. For example, perhaps a father desires to send a birthday card to his daughter before she leaves for college, but the daughter is not allowed to see the greeting until her birthday or the end of the semester, and the greeting conveys a vote of confidence (such as "You did great!"), indicating that the father always had faither in her abilities.

The personalization information could include location information that prohibits the recipient from receiving the digital greeting unless the recipient is in a specific location, such as the site of one's first date, or first home, or restaurant, etc.

The personalization information could include questions or riddles that the recipient must answer correctly. Perhaps a girlfriend conditions a boyfriend's receipt of the greeting card upon him correctly naming her favorite color and movie. Or a grandparent requires a grandchild to solve a playful riddle.

At a step 1814, an image file is generated based on the personalization information. The image file could be a JPEG, PNG, vector, or other format. Ata step 1816, the personalization information is stored (for example, in datastore 1620).

At a step 1818, metadata associated with the image file is also stored. The metadata is useable to discern characteristics of the image file in some embodiments. As mentioned, the digital greeting card can correspond to a physical version of a card that can be printed and sent.

At a step 1820, a link is associated with the customized digital greeting card. The link could be a web link, QR code, URL, string of digits, etc.

At a step 1822, an indication that the link has been referenced is received. For example, one of the computing devices 1612 might receive an indication that a remote computing device (1616, 1626) clicked on the link, followed the QR code, etc.

At a step 1824, the image file and/or the personalization information is retrieved from datastore 1620, and utilized to generate one or more textures that are applied to a 3D model of a greeting card.

At a step 1830, a digital animated version of a greeting card is generated from the 3D model. The animated version presents a representation of the image file and is consistent with the personalization information.

To confirm and as mentioned, the steps of FIG. 18 (and all figures) do not need to be followed in the order shown. For example, the textures could be applied and even animation generated prior to a recipient acting on the link. This would make presentation of the animation quicker.

In one embodiment, a follow-up vignette is presented to on the recipient device. This follow-up vignette can be a final video, animation, photo, text message, etc. that the recipient sees after delivery of the initial animated video.

Other aspects of the disclosed technology follow.

With reference to FIG. 1, a computing device 100 includes a bus 110 that directly or indirectly couples the following devices: memory 112, one or more processors 114, one or more presentation components 116, one or more input/output (I/O) ports 118, one or more I/O components 120, and an illustrative power supply 122. Bus 110 represents what may be one or more busses (such as an address bus, data bus, or combination thereof). Although the various blocks of FIG. 1A are shown with lines for the sake of clarity, these blocks represent logical, not necessarily actual, components. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the disclosed technology. (For example, presentation component 116 may be embodied as presentation component 130 and/or may be used as part of user interface 155 of FIG. 1A.) Distinction is not made between such categories as "workstation," "server," "laptop," "handheld device," etc., as all are contemplated within the scope of FIG. 1 and with reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. The computer-storage media can be non-transitory and/or embody non-transitory computer-executable instructions. Computing device 100 includes one or more processors 114 that read data from various entities such as memory 112 or I/O components 120. Presentation component(s) 116 presents data indications to a user or other device. Exemplary presentation components include a display device, including a projector, speaker, printing component, vibrating/tactile-feedback component, presentation component 130, user interface, and/or the like.

The I/O ports 118 allow computing device 100 to be logically coupled to other devices, including I/O components 120, some of which may be built in. Illustrative components include a microphone, joystick, game pad, satellite dish, scanner, printer, wireless communication device, etc. The I/O components 120 may provide a natural user interface (NUI) that processes air gestures, voice, or other physiological inputs generated by a user, for example, a user touching, motioning towards, selecting, or pointing to content projected onto a surface in a presentation environment. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, acoustic, infrared camera systems, RGB camera systems, RF-interference detection, or the like, and/or a combination of these for gesture detection and recognition. Additionally, the computing device 100 may be equipped with (or operate in conjunction with) accelerometers or gyroscopes that enable detection of motion. The output of the accelerometers or gyroscopes may be provided to the display of the computing device 100 to render immersive augmented reality or virtual reality.

The metaverse is associated with multiple definitions. For example, the metaverse refers to a universal and immersive virtual world that is facilitated by the use technologies such as virtual reality (VR) and augmented reality (AR) headsets. It can also include a network of 3D virtual worlds that facilitate social connections. Another definition is a virtualized reality that reflects real life. Although some might refer to "The Sandbox" as a metaverse or to "Decentraland" as a metaverse, as used herein, the term "metaverse" extends beyond such uses more akin to "universe," and thereby encompassing all such items and the hardware and software that facilitates interacting with and between such developments.

Figure 1B:
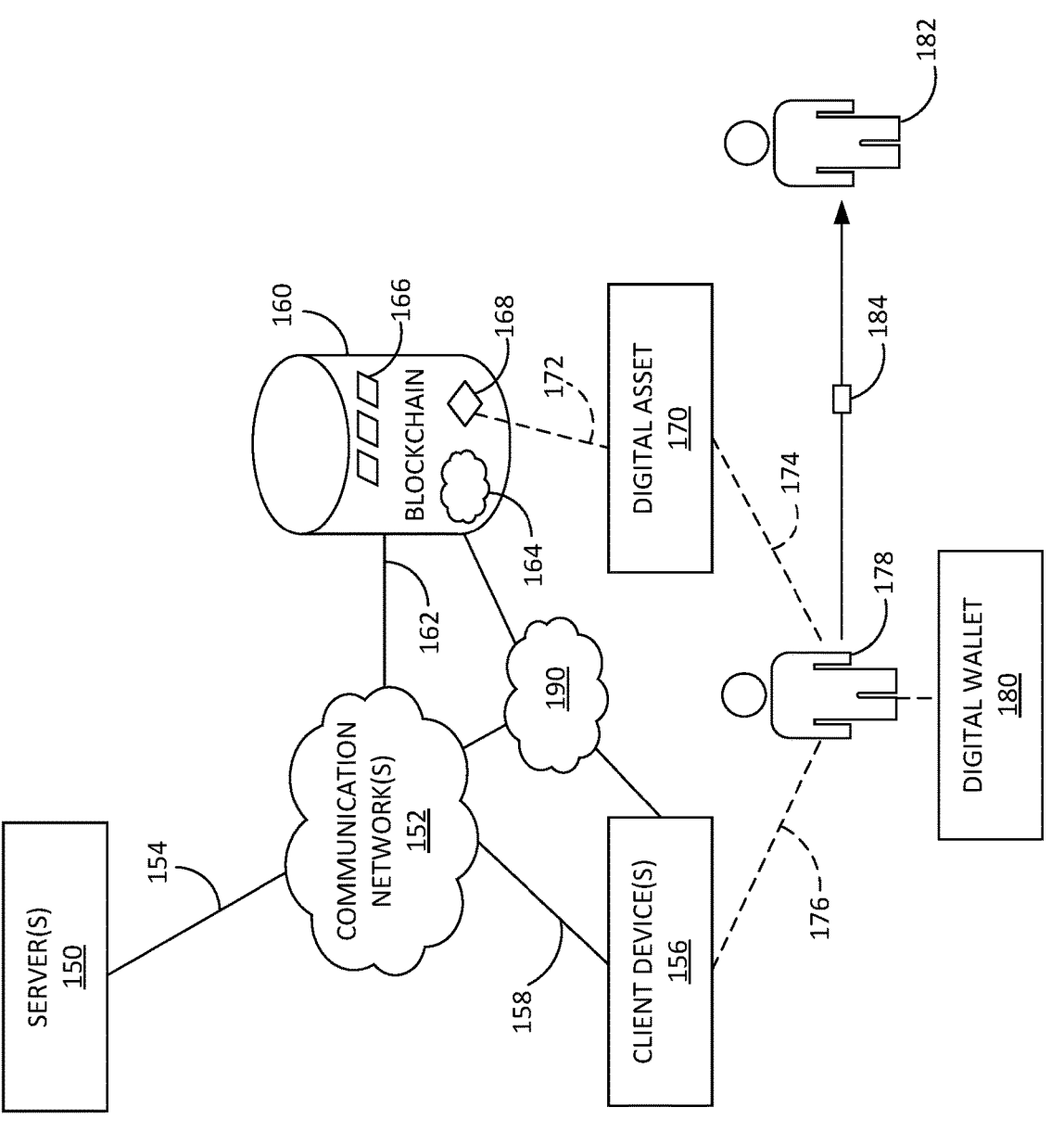
FIG. 1B is an illustrative computing environment suitable for use in aspects of embodiments of the disclosed technology.
Figure 2:
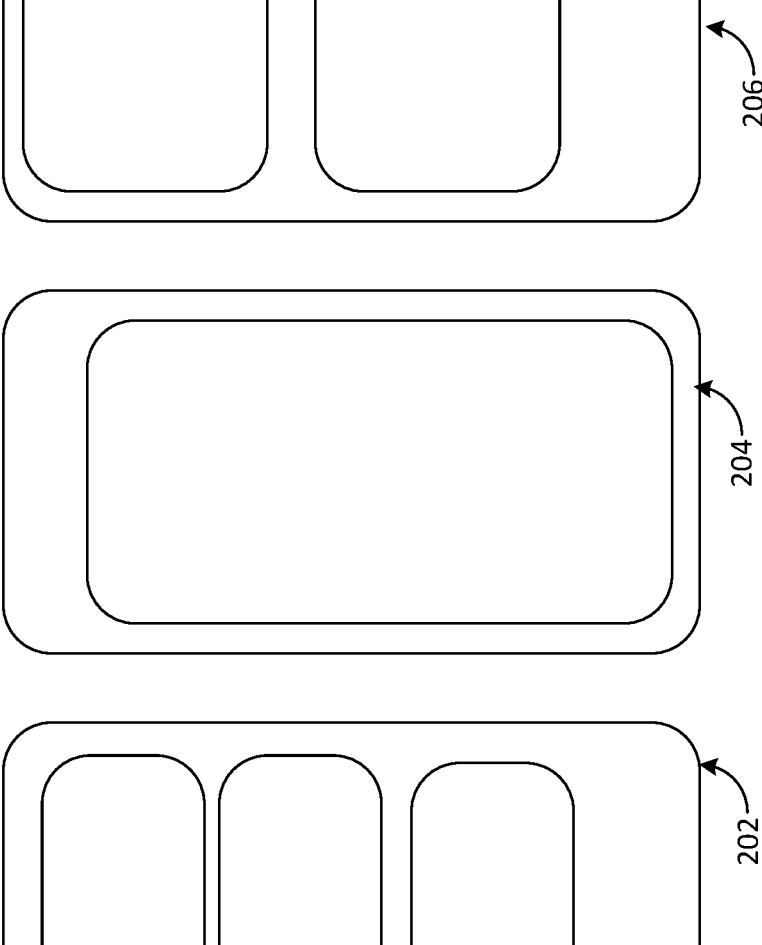
FIG. 2 provides illustrative user interfaces for optional operational modes such as scrapbook mode, diary mode, and treasures mode consistent with one or more embodiments of the disclosed technology.

FIG. 1B depicts an illustrative operating environment suitable for practicing an embodiment of the disclosed technology. A server 150 is coupled to a communication network 152 by way of a logical or physical link 154. Server 150 could take the form of the computing device depicted in FIG. 1A. Link 154 could be a wired or wireless link. Communications network 152 could be a telecommunications network, data network, long-distance network, short-range network, or any type of communications network.

Server 150 is coupled to client device 156 through communications network 152 by way of link 158, which is similar in nature to link 154. Communications network 152 is coupled to a blockchain 160 by way of link 162. Blockchain 160 could utilize distributed-ledger technology and is capable of facilitating interaction with a smart contract 164. Smart contract 164 is a set of code that executes automatically and deterministically in response to a set of inputs. Information to and from blockchain 160 can be facilitated by way of one or more oracles.

Blockchain 160 stores a series of transactions represented by numeral 166. In this way, a non-fungible token 168 or number of tokens ("NFTs") can be kept track of by way of blockchain 160. Although technically, NFT 168 might be a token stored on blockchain 160, herein, the term "NFT" is used synonymously herein to refer to a digital asset 170 to which NFT 168 refers (reference is made to the digital asset as the NFT despite some making a technical distinction). Blockchain 160 can be, for example, the Ethereum blockchain or similar. Item 160 also represents multiple blockchains, include side chains, shard chains, or chains at different layers, such as layer-2 blockchains that rollup transactions or report only net results on an underlying layer-1 chain.

In some embodiments, digital asset 170 is associated with user 178, as represented by dashed line 174. For example, a user's digital wallet 180 is useable to access the public & private keys that are associated with digital asset 170. As indicated by broken line 176, user 178 can also be associated with client device 156, which could be a computer, mobile phone etc., and could include metaverse-related hardware such as a VR headset or other.

In FIG. 1B (and in all figures), items depicted in the singular could actually be multiple (e.g., server 150 could be multiple servers, communications network 152 could be multiple networks, etc.). All or a portion of the various items depicted facilitate interaction with a virtualized environment 190.

An aspect of an embodiment of the disclosed technology relates to virtualized gifting. For example, crowns, hats, necklaces or other wearable items can be obtained, purchased, or conveyed to others to help them mark special days or occasions. These items could also provide exclusive access to events, experiences or locations.

Wearables in virtualized environment 190 can include items that a digital avatar could wear, including all forms of clothing, accessories, and similar. In one embodiment, the wearables are context-specific to celebrations. Thus, an avatar is outfitted with a first set of wearables, but upon entering a given location or participating in a certain event, the wearables are automatically updated. Thus, for example, users 178 could customize their avatars with wearables represented as digital assets 170. Ownership records of the wearables can be stored via blockchain 160. As users 178 enter into a tropical-themed space, for example, their wearable 170 would transform (actually or in appearance) to tropical-themed clothing. For example, the wearable 170 could be exchanged with a different digital asset 170 or it could be a single asset that is capable of assuming different appearances. The wearable could be a dynamic NFT.

Thus, digital assets 170 could be digital wearables, digital displayable (e.g. ornaments, yard signs, etc.), digital collectibles, digital "tools" that have unlock abilities. For example, the asset 170 is progressively more revealed or more fulfilled the more it is unlocked, which could occur by completing levels of engagement, answering trivia questions, completing games, completing a threshold number of giftings, etc. Ownership of virtual items 170 could be provided as a result of purchasing of physical goods in some embodiments.

Context-specific wearables can be used to recognize significant occasions, events, and holidays in a virtual space. For example, they can satisfy a desire to give a surprising and meaningful item to others, such as user 178 gifting item 184 to user 182. In that way, a transaction 166 would be logged in blockchain 160 to indicate that digital asset 170 was now associated with user 182 instead of 178.

The wearables 170 can be unique and traceable assets that connect to data about the owner whether actively connected or passively derived. This data can cause the wearable to automatically accent or adorn the owner's avatar in a virtual space on specific days, in specific virtual locations or during specific celebrations.

Wearables 170 can be digital assets that connect to information about the owners of the items. When purchased or received, they can be used/worn immediately and then upon future pre-programmed occurrences (e.g., in the virtual environment, via smart contract 164, etc.), they can also automatically appear from an avatar's inventory, storage or other non-active location onto the avatar's active person. This can occur through triggers pre-programmed into the item for example, birthday, holiday (like Halloween), anniversary of a friendship or event (e.g. first purchase in the metaverse), proximity to a location (e.g. upon arrival at a virtual event hall), proximity to another avatar (e.g. arrival to a location of a friend), in recognition of a milestone transaction/achievement (e.g. 60th purchase), etc.

Upon activation, the item 170 could either replace an existing item, whereupon that item would be transferred to inventory, storage or another accessible location, or be superimposed upon the previous item for a time that the celebration wearable is used. Although the celebration wearable may be smaller than the original accessory, the original item may not appear below it while superimposed, essentially also making the original item invisible. Any other participants in the virtual world will only see the celebration item in the area that it is worn as well.

These virtual items may be visible when observed in a digital 2D screen, 3D video on a VR device or movement-sensitive 2D screen, or through augmented reality lenses.

Automatic deployment can be carried out based on data triggers. Context-specific designs (e.g. birthday hat for birthday occasions, friendship necklaces for friend proximity, etc.) Visual prioritization can be relevant to pre-existing adornment Similar capabilities could be embedded within decorative virtual objects for virtual homes, lands, space, or even other objects or virtual pets. Upon receipt of an item, instead of the trigger being automatic, an owner may be prompted to indicate at what time, date, location, etc. they would like the item to deploy. Items could also be used as screening for admission to online events only during that specified time, discounts, or exclusive interactions.

Aspects of one embodiment of the disclosed technology, including aspects related to virtual gift items and functional formats. In accordance with an embodiment of the disclosed technology, user 178 can gift virtual items 184 that bestow new interactive or virtually functional benefits on their owners. For example, user 178 can give user 182 a bow that shoots ornament-laden arrows up onto user 182's virtual Christmas tree to make a decorating experience more engaging.

There are problems with the prior art. Virtual displays of NFTs, items or creations can—absent the disclosed technology—be static, uninteresting and unimaginative, often not reflecting the behavior or interaction a human has with them in real life. Plus, placement of items in 3D virtual worlds can be difficult requiring movement by avatars that is not enabled.

The functional items described herein can carry unique item/avatar interactions in the decorating, delivery, and similar processes. They are dynamic and entertaining, encompassing directed or automatic animation, temporary effects or permanent, and have virtual impact. Some illustrative use cases follow.

An ornament launcher is a new way to place items (including 3D items) within virtual environment 190. Instead of awkward and clunky movements and interactions to place decorative objects in 3D space, users can aim a target using the launcher onto any owned/rented 3D space. Once the target is locked on that location, an item (e.g., 170) in their inventory or held by their avatar can be "launched" to that location where it will be displayed until removed or until it's period of display ends.

A card shower is a delivery of virtual messages shown in rendered paper forms, starbursts, or even chirping birds. When sent to a location, they appear and burst into a cascade or cloud of messages that flutter to the virtual ground. Each singular object/item carries with it a unique message from a sender in one embodiment.

The snowball sweater is a wearable experience generator that can enable the avatar wearing it to throw virtual snowballs a certain distance from their position. This distance may vary and may be affected by factors such as walking/running, location (uphill, indoors, etc), skill level of the wearer, or even strength of the relationship from the person who gave it.

If an existing item is in that location, the decor item may not be launched/dropped or may be automatically redirected to an adjacent space, preventing overlap in one embodiment. An owner and any other participants in the virtual world 190 will be able to see the displayed items in their location and also the movement of them from their point of origin (e.g. avatar holding them, appearance in the "sky", etc.) in one embodiment.

Virtual items and actions may be visible when observed in a purely digital 2D screen, 3D video on a VR device or movement-sensitive 2D screen, or through augmented reality lenses. They will appear different from different angles as a realistic 3D item would in one embodiment. The movement or presentation of them would be temporary and only able to be revisited through video of the event in one embodiment.

An embodiment of the disclosed technology facilitates dynamic presentation/placement and aided display of virtual goods.

An embodiment of the disclosed technology facilitates dynamic presentation/placement and aided display of virtual goods.

Multiple participants, each carrying an enabling object/service, could participate at one time in one embodiment.

Embodiments of the disclosed technology contemplate functional virtual items and decor. For example, a gift, meanwhile, becomes a relationship experience. In virtualized environment 190, gifts can come with playful bonuses or a social interaction built in. A holiday sweater, for example, can be purchased in a local environment. It can come with a backpack full of snowballs. Thus, it can become an invitation for people to connect and play in the virtual snow. Holiday décor could be sold in kits, to facilitate overlaying one's virtualized home or event space with intriguing, interactive elements, such as hearts falling like snow on a Valentine's Day date or reindeer flying through a family holiday party. Multiple themes are available in some embodiments and aesthetics so people could choose a desired design look and feel.

Aspects of celebration items are contemplated in accordance with an embodiment of the disclosed technology. Digital items, accessories, and decor 170 are made available to celebrate a special day in one embodiment. These could include digital balloons, flower bouquets and streamers or wearable items likes crowns, capes, party hats, and strings of beads.

Items could confer special abilities, experiences or access to the owner/wearer. This allows familiar formats available to recognize someone's important day, making them feel special. An embodiment of the disclosed technology enables reminders and keepsakes of virtual interactions.

Aspects related to dynamic augmented reality experiences include keepsakes unboxing. For example, positions of an ornament box lid unlock different levels of an augmented-reality experience, beginning with a glimmering of excited anticipation, followed by celebration as the box is opened and culminating in full animation when the box is fully open.

As another example, moving a box lid relative to a phone camera (part of device 156) identifies different images associate with a folded paper box and enhances the opening experience. As shown, the front of the box begins an anticipatory experience while turning the box to view the lid in addition to the front of the box advances the excitement of the animation in one embodiment. When the box is completely open, an animation specific to the ornament is augmented across the screen in one embodiment.

Wrapped gifts viewed through a digital lens glimmer with excited anticipation while still closed/filled, followed by celebration as the gift bag is opened or tissue is removed and culminating in full animation when the bag is fully open in one embodiment.

In another example, as a parent takes a video of a child on Christmas morning, one package wrapped in a gift bag gleams on his video screen. As his daughter opens the gift bag, the animation builds with confetti and streamers until the bag is fully open and all the tissue paper removed in one embodiment. Then, on his screen digital reindeer that match the gift wrap design begin dancing in one embodiment.

There are problems with the prior art. Augmented experiences that change based on the form/position of a 3-dimensional object are not on the market today. Reality is three-dimensional, with rich data to more enhance gifting actions that foster rich interpretation, delivering deep personalization has yet to be harnessed.

Augmented experiences that transform based on the form/position of a 3-dimensional object will fundamentally transform the nature of gifting. An aspect of this disclosed technology simplifies the process of layering computerized information over living or non-living objects to create deeper personalization of the gifting process.

In one embodiment, augmented reality can be deployed using special 3D programs which superimpose animation in the computer program, to a unique AR "marker" in the real world.

Positions of an AR "marker" unlock different levels of AR experience, beginning with a glimmering of excited anticipation, followed by celebration and culminating in full animation.

A working mechanism of augmented reality leverages a smartphone camera as an input device for image recognition. As the camera points at a real-world object such as a bag or box, the camera lens switches to grayscale for faster image processing. The presence of a unique marker defines the experience.

After the initial object detection, built-in AR software extracts important features and stores them in the system's available memory. In real-time, the details captured are object coordinates, length, width, relative distance, and main features like shape, color, size, etc.

Once the data is stored, the camera and the object form a relationship. The software chooses the content associated with the marker and sends it out to overlay the object. In some cases, it downloads virtual content from a host server, also known as AR Cloud, such as server 150.

Reflectors, such as smart mirrors can be an integral part of AR devices as it overrides the physical background with virtual overlays for the viewer. An array of concave or convex mirrors can be used to align image illumination with the user's vision and hype up the perception of reality.

Packaging could include an indicator of the type of corresponding AR enhancement that is possible to activate with a particular item of gift presentation.

Memorable moments captured within the AR experience could be stored through the app-access or in the phone's native album. These could also be projected at scale into virtual environment 190 for enjoyment by a giver over distance.

In one embodiment, a gift container can be scanned from a number of different angles and software recommends specific products to include inside of the specific container to build out a perfect gift in a basket or container that the giver already owns.

In one embodiment, a user can swap in/out different items to virtually "build their basket" and then order the collection of things as a total set to be mailed directly to them . . . even the clear plastic wrap!

Aspects of a gift giving service or delivery service are included. In one embodiment, when someone wants to give a gift to another in virtualized environment 190, it arrives through public delivery by an animated character. The character delivering the gift could follow the recipient's avatar around the virtual world until the gift was opened and as more gifts are received, the line of deliverers could grow in one embodiment.

There are problems with the current state of the art. The exchange of gifts is deeply rooted in many societies and has been widely recognized as both socially and economically important. Gifting services are a longstanding aspect of traditional physical/online retail experiences and are now finding their way into the metaverse. A myriad of digital artifacts can be exchanged online. While previous studies suggest that these are sometimes considered to be gifts, a feature of this disclosed technology is a process that will enhance explicit acts of digital gifting by which we mean situations in which people deliberately choose to give (and receive) digital media as gifts from the outset.

A method enabling a first party to purchase a gift and to deliver the gift to a second party includes providing a virtual environment 190 that enables the first party 178 to mint an ERC-1155 ASSET NFT 168 as a gift 184 in the environment, receiving a pseudonym or identifier of the second party 182 from the first party, procuring a location in the virtual environment of the second party 182, and delivering the gift 184 to the procured location. Gifting the 168 NFT is the process of transferring an NFT from one's wallet 180 to someone else's wallet in one embodiment.

An embodiment of the disclosed technology enables a gift-giver 178 to send a gift 184 to a recipient 182 even when the gift recipient's virtual environment (e.g., world) location is unknown to the gift-giver 178. However, the receiver of the gift is a part of a list of allowed participants in one environment. For example, a "Friends List" could contains the realm, coordinates, and island of the potential recipient.

An illustrative process is now described. Connect one's ERC-20 compatible digital wallet 180. Mint an ERC-1155 ASSET NFT 168 (entities (peoples or animals), equipment (swords, shields, or helmets), and wearables (cosmetic items changing an avatar's looks)) of the proposed gift in the ERC-20 token representing cryptocurrency supporting a virtual world 190. Create or retrieve a cute avatar of the gift bearer (Unicorn, Puppy, etc.).

A second embodiment is now described. Mint an ERC-721 LAND NFT 168 that represents plots of virtual land of the proposed gift 184 in the cryptocurrency supporting a virtual world 190. Choose the ERC-1155 ASSET representing the personalized "box" for the ERC-1155 gift. Choose the cute default gift bearer avatar or purchase the ERC-1155 avatar upgrade in the virtual world marketplace. Deploy cute gift bearer using realm, coordinates, and island or recipient.

In one example, a gift presentation becomes an unwrapping experience—where the delivery method is part of the surprise, the reveal is something magical, and the recipient feels extra special.

In one example, anytime someone wants to give a gift to another person in the virtualized environment 190, it arrives as a wrapped item outside of their "home" location. The gifts could amass in a large pile in front of the recipient's home in anticipation of an event or until they are opened.

In one embodiment, anytime someone wants to give a gift to another person in the metaverse 190, it arrives in a fantastic and visible fashion. This could be through public delivery by an animated character or the appearance of the wrapped item outside of their "home" location. The character delivering the gift could follow the recipient's avatar around the virtual world until the gift was opened. Or gifts could amass in a large pile in front of the recipient's home in anticipation of an event.

Unique perspectives can be created by looking at layers of paper through different views unlock or transition between different AR experiences in one embodiment.

Aligning a camera to look through the archway (vs. from the side or at an angle) aligns the image of the layers of paper just right to unlock the associated 3-dimensional AR animation of girls swinging in one embodiment.

When viewed from other angles, different animated experiences may be unlocked to help guide the viewer into the experience. Or they may present different content like animated views of what the scene could look like outside the card.

This facilitates expansion of an immersive experience beyond a single dimension to multiple dimensions and varied experiences.

A feature of the disclosed technology provides for an expansion of an immersive experience beyond a single dimension to multiple dimensions and varied experiences.

Expansion of an immersive experience beyond a single dimension to multiple dimensions and varied experiences In one embodiment, AR applies multiple different image trackers in a single product for a dynamic experience. Depending on which image is visible, the experience changes. An initial recognized tracking point or image may initiate the digital 3D experience and that experience may persist as the object rotates and moves continuing to tether the 3D virtual animation to the physical marker in one embodiment. However, when the object folds or rotates to a new position in which a new marker is identified, the experience may change. This new position may be achieved by rotation, but also by folding and transforming the paper from one shape to another.

These virtual experiences may be visible when observed in 360 degrees on a VR device or movement-sensitive 2D screen, or through augmented reality lenses Virtual experience persistence is enabled while consistently comparing visual input to known image triggers. Physical object transformation/manipulation yields a virtual experience transformation.

Other folded paper or transformative devices can include multiple optical triggers (e.g. folded packaging—Greeting Card Explanation—where a folded flat card can trigger an explanatory AR experience while the fully unfolded card can yield a more interactive and entertaining experience)

As added content in the video of an experience opening a card or package and/or as a descriptive and informational overlay to help understand more about the product/object Aspects of the disclosed technology could be used as instructional steps throughout the construction of an object—every time the next step is reached successfully, the image is recognized and the next step is described/displayed (e.g. origami folding).

Other aspects of dynamic augmented reality experiences include greeting card explanation. These aspects relate to an experience such as shopping a display of upright, folded cards initiates an AR experience of product explanation while using the same AR lens on the unfolded product initiates a fully animated, digitally extended experience.

For example, shopping the greeting card display through the AR lens shows what a card could look like unfolded without the shopper needing to remove it from the shelf. When the card is removed from the shelf and popped open, unfolded or otherwise transformed, different visual markers revealed launch new AR experiences or animated content. This could be achieved through popping up the layers of paper, moving them relative to each other or even opening up the greeting card.

Aspects of physical gifts/me-to-you connecting include automatic "photo" card delivery. In one example, a card arrives at someone's home with a message and "photo" from their friend that they have only known virtually. This friend doesn't know their address (and doesn't have to) and the card was automatically sent, for free, based on in-game interactions.

Physical delivery can be designed according to the expected recipient predefined meta preferences or insights about the sender and/or recipient.

Additionally, the likelihood of physical card sending may increase at certain occasions, seasons or events known to have meaning to either sender and/or recipient.

Game-based connecting extends beyond the screen into real world space.

The disclosed technology enables reminders and keep-sakes of virtual interactions and provides exposure to a commercial targets with relevant solutions and potential loyalty growth. It can favorably influence evolution of digital connecting behaviors and increased brand awareness.

Prior-art problems include preference for interaction with physical, IRL objects can be provided, and electronic-free memory-keeping and communication devices Automatic-card-delivery aspects mark a moment in time when a threshold of digital/virtual communication is reached by automatically sending a physical greeting, postcard or note to one or both of the parties in the relationship. This card can include photos, content and/or text representative or directly derivative of the virtual communication.

One method includes, upon setting up an account, a user indicates a willingness to share address information with the greeting card manufacturer for the purpose of redeeming in-game rewards. This address is kept confidential and not shared with other game participants or companies and is used solely for the purpose of fulfilling rewards.

Thresholds of interaction and/or communication can be set. Upon reaching one of these thresholds a stored photo from the game could be applied to a greeting card design, physically printed and automatically mailed to the recipient by the card manufacturer.

Alternatively, the sender could be notified that they have reached the required reward level and asked to choose among variables for the creation of the card, such as the included photo, specific message to the recipient, and/or card design. They may also be asked whether they choose to redeem this reward now or at some later date.

An accumulation of rewards could unlock more unique, larger and/or valuable printed cards.

Automatic deployment based on significant data triggers and stored addresses can be provided, as well as printing of images from virtual scenarios.

Aspects of physical gifts/me-to-you connecting include automatic gift creation. In one example, automatic product creation based on interaction in a virtualized environment is provided. Physical gifting engagement and creation and sending of a unique make-on-demand product correspond-ing to meta engagement/preferences are provided.

Physical gifts could include 2D images printed onto 3D substrates, 3D printed items (e.g. ornaments, figures, toys, etc.) from a 3D in-game rendering of a character, object or scene, or other custom manufactured object.

Aspects of physical artifacts include connection to digital gifts. In one embodiment, receipt of a digital gift causes an excited motion or display in a tangible item. Whether currently in the metaverse or not, the recipient will anticipate the surprise of their virtual gift opening.

Aspects of the disclosed technology relate to a social network using tangible collectables. This can take the form of tangible products communicating with each other in the same household or to other households. Each object enables the virtual presence of a person or group of people and facilitates one-to-one, one-to-many, many-to-one, many-to-many communication in one embodiment. Each product can send data to each other in the form of (image, audio, video, text, motion, animation, play pattern, etc.) in one embodi-ment.

This aspect uses turn based interactions and leverages existing infrastructure. An embodiment of the disclosed technology can be used to record an input from the user, send this data to another connected product, then interpret and display the data based on the concept/form factor in which the product is designed. This data can affect the (physical) state of the receiving product, depending on the form factor. (e.g. it can cause it to change color or glow with a response, move with excitement, display a text message, shift figures on a diorama, play an audio recording, cause more lights to come on a tree, etc.)

Example: A connected book that records and sends con-sumer audio to another connected book, allowing the 2nd book to play that recording back. A sculpted figurine that allows you to choose a pre-recorded licensing message to activate within another connected figure connected across the miles. E.g. One person has a figurine and another person has another figuring. They could send catch phrases to each other by selecting one that would activate it in the other. "I love you." "I know."

Family legacy Audio album—each family member has own copy of same album. Each use can initiate by recording their voice into any frame in their collection. Each member records their answer to their prompt in the album. Voice message is shared with corresponding frame(s) connected across the internet. All recorded answers are collected in all albums and are accessible by designated group of users (the family).

Aspects of connected physical artifacts include in real life ("IRL"), NFT, or digital memory display. A holographic display projects 3D images/video of meaningful art or memories in physical space. EXAMPLE: A wireless con-nection allows display of an NFT, avatar, or other asset from the metaverse into real space. A speaker, mini projector(s) and a holographic 3D canvas allow 360 viewing/experienc-ing of the asset. A sensor could control its orientation and a mute button its sound. In display mode it might stay silent and just cycle through a few preview frames, but play mode it would enable the full experience in one embodiment. When turned on, it becomes an extension of the virtual asset, checking with blockchain 160, so there can be only one physical instance of the digital asset 170 in one embodiment.

Aspects of connected physical artifacts include connec-tion to digital location/engagement. Playful plush avatars provides an illustrative context. EXAMPLE: A plush with accessories (birthday hat, Santa hat, adventure hat, etc.) Consumer puts accessory on the plush and it sends a signal to the virtual avatar of the same plush in the metaverse. Now that avatar is ready for a party, or ready to adventure, etc. This could work with other concepts.

Aspects of physical artifacts include sensory companion items. Ornaments, cards or other physical objects deliver sensory enhancements to the digital experience. EXAMPLE: physical objects round out a virtual experience by delivering the multisensory components of the meta-verse. Small textiles or scented greeting cards corresponding to places or objects in the metaverse create full immersion. These objects could also serve as automatic rewards sent to a recipient based on in-game interaction between the sender and the recipient or they could be physical objects delivered when the corresponding digital item is purchased in the metaverse marketplace.

Another example follows. Recordable Storybook with legacy upload and virtual playback experience. A problem with the prior art is that recordings are not forever and sometime are lost as the books/electronics age. This is especially hard on the consumer when the loved one who recorded the book initially has lost their voice or passed away.

An embodiment of this disclosed technology will solve this legacy issue and allow a virtual twin of the experience to come into being by: adding a title and unique identifier code and cable connection (or wireless radio or audio signal) into the book to allow the recordings to be uploaded into the same virtual title, tied to a user account in one embodiment. Consumers will have the option of experience the same consumer audio playing while a virtual version of the book is held before them.

Should the real-life version of the recordable book fail in the future, consumers will have the option to download their virtual copy of the audio into a recordable book purchased at retail (or ordered online) in one embodiment. In the latter case the replacement book will arrive already with the audio they initially associated with that title.

Other versions can have the consumer recording directly into their mobile device or VR wearable and having the audio stored for future virtual experiencing or POD tangible output.

Aspects related to connecting items/services are contemplated within the scope of an embodiment of the disclosed technology. An example includes a greeting card in a virtualized environment 190 becomes a new form of ecard and can range from a simple designed message like you see here (which is a step up from the plain messages one can send today) to a full virtual-reality story and wish.

Aspects of virtual gift tags include tags to add giver information and meaningful context. EXAMPLE: a virtual gift given in a virtualized environment 190, across platforms, has a virtual gift tag added to provide context to the giving scenario, convey a feeling or identify the giver, e.g., a paired virtual gifting experience with reciprocity.

The act of gift giving is often an experiential in real life experience that is enhanced by the consumer taking the extra step in wrapping and presenting the gift in a "special" manner. Putting this extra effort into the giving makes the receiving of the gift that much meaningful. There is no easy way to give and enhance the giving while also closing the loop with the sender.

An embodiment of the disclosed technology provides an experience that mimics the gift presentation and surprise and delight that occur in real life and brings it into the metaverse. The process takes advantage of the visual and experiential storytelling that can occur virtually and gives the sender and recipient a level of privacy protection and specialness with the giving and receiving. It also allows the closing of a giving loop by automatically sending a conceptual message back to the sender (letting them know that it was opened) as well as giving the recipient a chance to thank the sender quickly and easily.

An embodiment of a virtual gift tag acts as a gift identifier and comes with an associated virtual wrapper/container. The tag can be personalized with the recipient's avatar and/or name. It can have a public (recipient name/avatar) AND private state (message, handwriting, photo, video recording).

The gift tag can operate in conjunction with a virtual wrapper/container, which can take on numerous forms within an invisible geometric 3d bounding box, sphere or other shape. The wrapper that contains the virtual gift can be any decorated static or animated storified form (bird, spaceship, blooming flower, swarm of fireflies, box, skull etc.) or any state of matter. The wrapper will hover near the avatar waiting until selected by the recipient whose account is associated with it in one embodiment.

No one else can interact with the wrapper at this point, but they can see it in one embodiment. Selecting the wrapper will allow the user to access the virtual gift tag. At this point the user will know who it is from. Only the user can select the tag and experience the private message from the sender it in one embodiment.

The user can then open the wrapper/container which does 2 things it in one embodiment. First, it allows the wrapper to "open" experiential way. (e.g. the fireflies fly away, the box unfolds, the bird explodes into feathers, etc.). Second, it reveals the virtual gift (which grows in size to fit the original invisible bounding box).

Depending on the user's privacy settings, others within the metaverse may see this gift as well. Third, a return message is sent to the sender in the form of a miniature conceptual version of whatever the original wrapper was. (Like a single firefly zooming off to the sender.)

One feature of this service is that the virtual gift tags and wrapper would be available within any virtual gift checkout on any number of virtual worlds. This would add an interoperable universal storytelling gifting enhancement to any giving situation. At the point of checkout, the gifter can choose from any experiential gift wrap option to enclose their gift within. They will see an animated preview of what the recipient will experience.

Aspects of calling-card type of features are contemplated. Virtual objects with identification information. EXAMPLE: the disclosed technology provides for meeting someone new in the metaverse, assisted with the transfer of digital calling cards. These cards could provide methods for direct virtual connection or even greater functionality like the ability to know when a contact is also online and where to find them.

Event spaces in a virtualized environment 190 are disclosed and related to themed spaces. Pre-decorated spaces by season, occasion or theme are rentable for personal use or gatherings in one embodiment. EXAMPLE: people can rent a space fully equipped with seasonal or themed decor for their friends, family or acquaintances to gather for an event. These spaces could include interactive items, décor, or even games.

Aspect of collaborative virtual home ownership are described. One example relates to a place where traditions, history, and culture are embedded into the decorations and activities. EXAMPLE: families can create shared virtual spaces to decorate, gather and relive personal traditions for the holidays. These virtualized "homes" become collaborative collections of objects and architecture that represent the things and people that mean the most to them.

Rights to the space can be determined by designations given to each participant/family member. The original host can choose to share host/hostess access, member, or guest access with each person and assigns the associated rights. Hosts/hostesses can be multiple and each can add to/take things from the space and move things around. Members may be able to move things around and pick them up, but cannot remove them. Guests may only be able to move or look in detail at objects/scenery.

Open access to multiple people as defined either by the host/hostess or owner(s) is provided.

Another example related to celebrations in the metaverse is described. The disclosed technology provides for an event architect, planner, and host. A themed 360-degree dream is provided for parties with creative environments, decor, playlists, digital wearables, activities and games. An immersive licensed experience could be offered—like a party in a well-known space, where participants could fly on broomsticks or design a magical birthday cake. Celebrations in the Metaverse combine creativity, storytelling, bringing people together.

Home-related aspects include allowing users to create shared virtual spaces to decorate, gather and relive personal traditions for the holidays. These metaverse homes become collaborative collections of objects and architecture that represent the things and people that mean the most to them. This provides customizable space for people to share traditions and experiences and an opportunity to connect from anywhere. It also provides digital land/space sales revenue and/or digital product sales revenue, exposure to a new consumer target with relevant solutions, and influence evolution of digital connecting behaviors.

Entertainment avatars/services include birthday-party hosts. One embodiment provides virtual birthday party assistants. EXAMPLE: anyone can host a virtual birthday party without all the curation, imagination and direction required to put one together completely. Services are provided to decorate the space, deploy the games and serve as hosts while guests arrive and participate in activities.

Many different arrangements of the various components depicted, as well as components not shown, are possible without departing from the scope of the claims below. Embodiments of the disclosed technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. One or more non-transitory computer-storage media having computer-executable instructions embodied thereon that, when executed by a computing device, cause the computing device to perform a method, the method comprising:

receiving a first image of a first portion of a greeting card wherein the first image includes identifying data useable to identify the first image;

storing the identifying data in a datastore;

associating the identifying data with a first user;

determining characterization information from the first image that characterizes aspects of the first image;

receiving from the computing device a second image of a second portion of the greeting card wherein the second image includes at least part of the first portion of the greeting card;

utilizing the second image as a lookup key to identify the first user;

correlating the characterization information of the first image to attributes of one or more product offerings; and communicating an indication of at least one of the product offerings to the computing device.

2. The computer-storage media of claim 1, wherein the first image includes a set of fiducial marks that are recognizable by a computer software program, wherein the fiducial marks allow the size and location of the first image to be determined in absolute terms.

3. The computer-storage media of claim 1, wherein the greeting card is a physical card or digital card.

4. The computer-storage media of claim 1, wherein the identifying data is all or a portion of the first image itself, including an image on a face of the greeting card.

5. The computer-storage media of claim 1, wherein storing the identifying data in the datastore includes one or more of (1) storing the first image itself or (2) storing information about the first image.

6. The computer-storage media of claim 1, wherein utilizing the second image to identify the first user is facilitated by comparing attributes of the second image and to attributes of the first image, wherein the attributes of both the first and second images were stored via the computing device.

7. The computer-storage media of claim 1, wherein correlating the characterization information of the first image with attributes of one or more digital offerings includes referencing one or more of the following:

past purchasing information about other users who have attributes in common with the first user;

products rated highly by other users who have attributes in common with the first user;

past purchasing information about purchases of a second user;

attributes of the second user;

attributes of the first user;

attributes of other users who have attributes in common with the first user;

attributes of other users who have attributes in common with the second user; or attributes of the first image.

* * * * *